(12) United States Patent  
Keeper et al.

(10) Patent No.: US 11,346,460 B2  
(45) Date of Patent: May 31, 2022

(54) INTEGRATED ACTUATOR MANIFOLD FOR MULTIPLE VALVE ASSEMBLY

(71) Applicant: Swagelok Company, Solon, OH (US)

(72) Inventors: Branden W. Keeper, Mentor, OH (US); William H. Glime, III, Chagrin Falls, OH (US); Samuel Gunther Houser, Southington, OH (US)

(73) Assignee: SWAGELOK COMPANY, Solon, OH (US)

( * ) Notice: Subject to any disclaimer, the term of this patent is extended or adjusted under 35 U.S.C. 154(b) by 62 days.

(21) Appl. No.: 16/779,731

(22) Filed: Feb. 3, 2020

(65) Prior Publication Data

US 2020/0248831 A1 Aug. 6, 2020

Related U.S. Application Data

(60) Provisional application No. 62/801,388, filed on Feb. 5, 2019, provisional application No. 62/801,379, filed on Feb. 5, 2019.

(51) Int. Cl.
| | |
|---|---|
| *F16K 31/122* | (2006.01) |
| *F16K 7/17* | (2006.01) |
| *F16K 27/00* | (2006.01) |
| *F16K 31/42* | (2006.01) |

(52) U.S. Cl.
CPC ............ *F16K 31/1221* (2013.01); *F16K 7/17* (2013.01); *F16K 27/003* (2013.01); *F16K 31/1225* (2013.01); *F16K 31/42* (2013.01)

(58) Field of Classification Search
CPC ...... F16K 27/003; F16K 31/1221; F16K 7/17; F16K 37/0041; F16K 27/02; F16K 31/1245
See application file for complete search history.

(56) References Cited

U.S. PATENT DOCUMENTS 4,111,226 A * 9/1978 Cameron ............ F15B 13/0405  
137/269  
4,789,526 A * 12/1988 Matkovich ............ B01D 61/18  
422/527

(Continued)

FOREIGN PATENT DOCUMENTS

| EP | 3426959 | 1/2019 |
| JP | 5762744 | 8/2015 |

OTHER PUBLICATIONS

International Search Report and Written Opinion from PCT/US2020/016314 dated Jul. 17, 2020.

*Primary Examiner* — Umashankar Venkatesan  
(74) *Attorney, Agent, or Firm* — Calfee, Halter & Griswold LLP

(57) ABSTRACT

An actuator assembly includes a unitary actuator housing defining a plurality of actuator cavities each extending along a central axis from an upper surface of the actuator housing to a lower surface of the actuator housing. A plurality of actuating members are each disposed in an upper counterbore portion of a corresponding one of the plurality of actuator cavities and movable within the corresponding actuator cavity. A plurality of output shafts each extend through a lower bore in a corresponding one of the plurality of actuator cavities, with each output shaft being driven by a corresponding one of the plurality of actuating members.

21 Claims, 22 Drawing Sheets

(56) References Cited

U.S. PATENT DOCUMENTS

| | | | |
|---|---|---|---|
| 5,950,661 A * | 9/1999 | Kirchhoff-Stewens | ...................... F16K 11/22 137/269 |
| 5,983,863 A | 11/1999 | Cavanagh et al. | |
| 6,736,370 B1 * | 5/2004 | Crockett | ............... F16K 27/003 251/129.17 |
| 6,832,628 B2 | 12/2004 | Thordarson | |
| 7,353,743 B2 | 4/2008 | Bugel | |
| 8,127,783 B2 | 3/2012 | Balarabe | |
| 8,177,188 B1 * | 5/2012 | Johnson | .............. G01M 3/2876 251/63.6 |
| 8,658,040 B2 * | 2/2014 | Strube | ................ B01D 15/1842 210/659 |
| 8,944,780 B2 | 2/2015 | Reilly | |
| 9,442,493 B2 | 9/2016 | Trantham et al. | |
| 10,184,364 B2 | 6/2019 | Beyer | |
| 2013/0207385 A1 * | 8/2013 | Williams | ............... F16L 37/088 285/307 |
| 2016/0280197 A1 | 9/2016 | Mayr et al. | |
| 2019/0062084 A1 * | 2/2019 | Delieutraz | ........... B65H 3/0891 |

\* cited by examiner

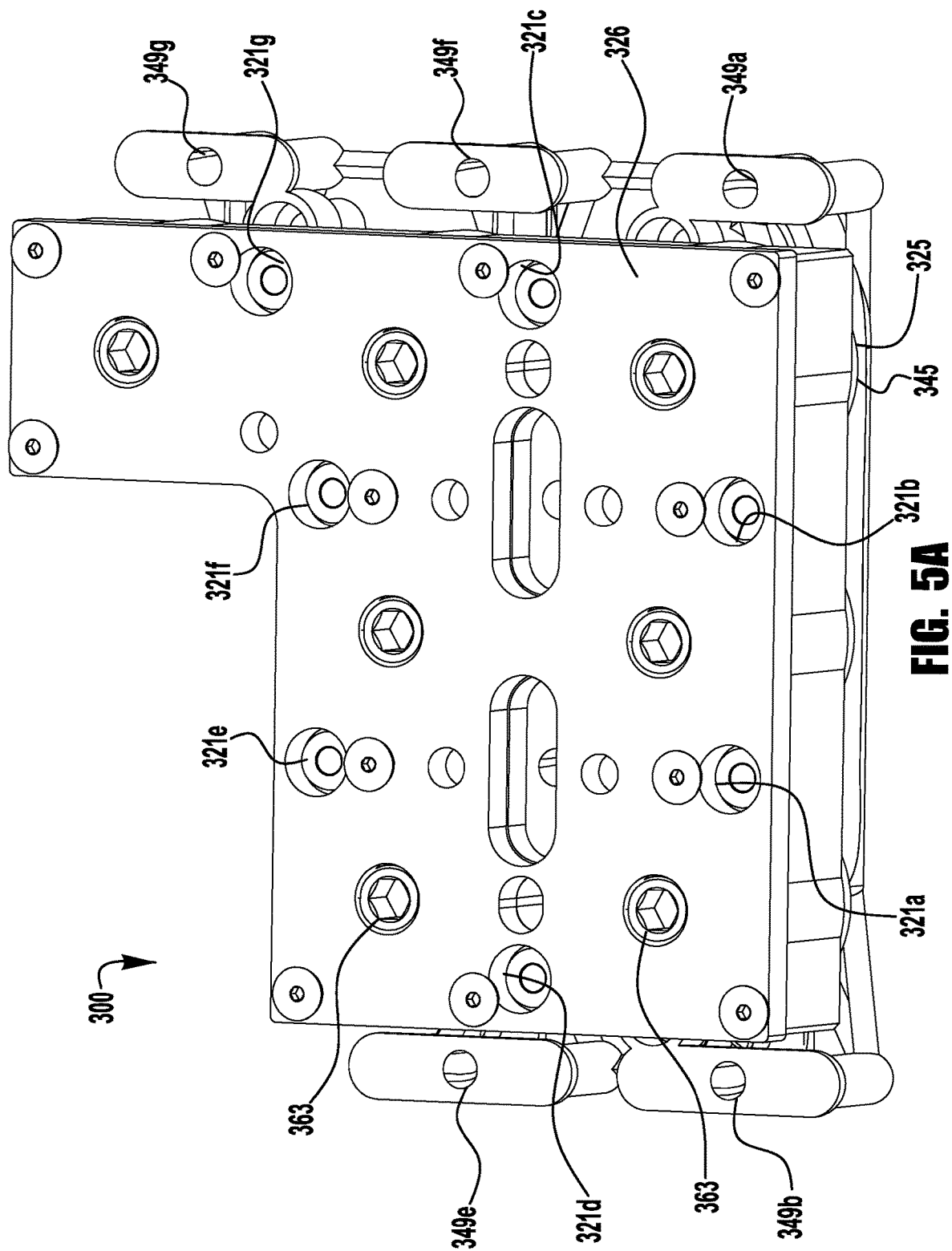

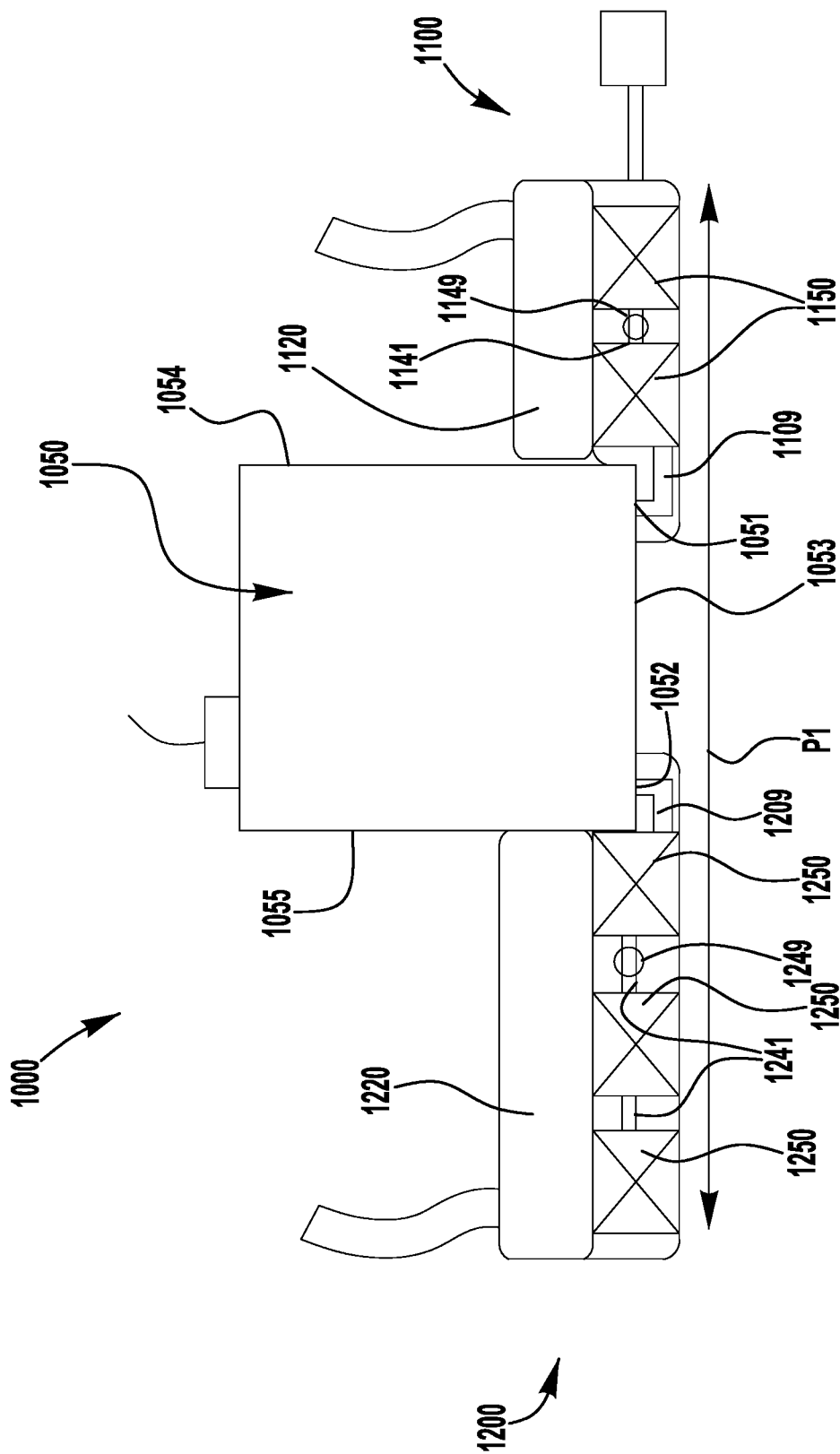

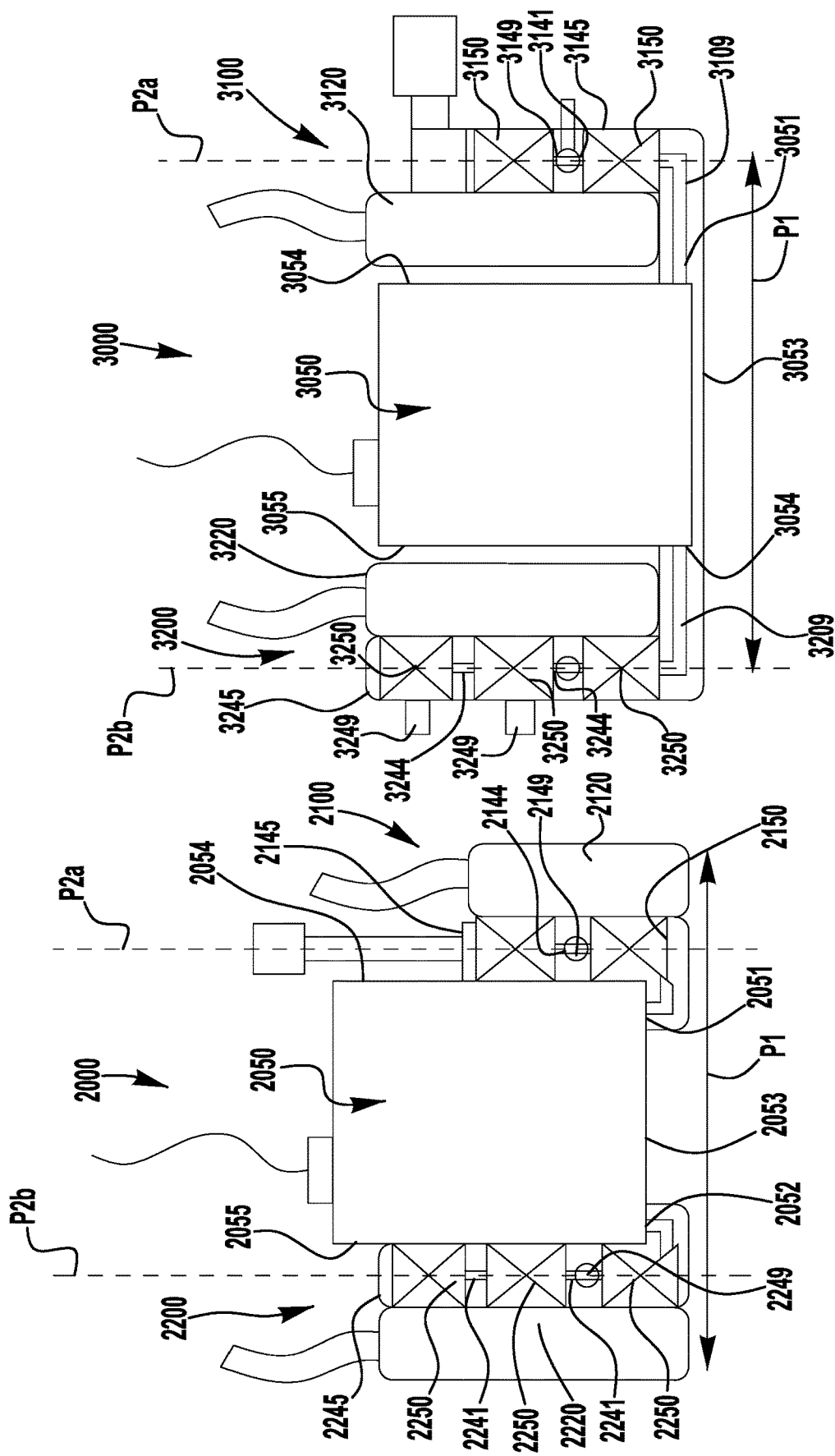

INTEGRATED ACTUATOR MANIFOLD FOR MULTIPLE VALVE ASSEMBLY

CROSS-REFERENCE TO RELATED APPLICATIONS

This application claims priority to and all benefit of U.S. Provisional Patent Application Ser. No. 62/801,379, filed on Feb. 5, 2019 and entitled INTEGRATED ACTUATOR MANIFOLD FOR MULTIPLE VALVE ASSEMBLY, and U.S. Provisional Patent Application Ser. No. 62/801,388, filed on Feb. 5, 2019 and entitled VALVE MANIFOLD ARRANGEMENTS FOR GAS DISTRIBUTION SYSTEM, the entire disclosures of each of which are incorporated herein by reference.

BACKGROUND

Fluid systems often include multiple valves arranged for mixing, switching, purging, and other such controls of one or more types of fluid, for example, for gas distribution employed in the manufacture of semiconductor wafers. Multiple valve arrangements have been provided in one or more manifold valve blocks, thereby reducing assembly size and the number of fluid connections.

SUMMARY

In an exemplary embodiment of the present disclosure, an actuator assembly includes a unitary actuator housing defining a plurality of actuator cavities each extending along a central axis from an upper surface of the actuator housing to a lower surface of the actuator housing. A plurality of actuating members are each disposed in an upper counterbore portion of a corresponding one of the plurality of actuator cavities and movable within the corresponding actuator cavity. A plurality of output shafts each extend through a lower bore in a corresponding one of the plurality of actuator cavities, with each output shaft being driven by a corresponding one of the plurality of actuating members.

In another exemplary embodiment of the present disclosure, a fluid distribution system includes a mass flow controller and first and second manifold assemblies. The mass flow controller has a first end port and a second end port extending from a lower end of the mass flow controller, proximate corresponding first and second sides of the mass flow controller, for lateral flow through the mass flow controller from the first end port to the second end port. The first manifold assembly includes a first end connection coupled to the first end port of the mass flow controller. The first manifold assembly includes a first manifold body extending parallel to the first side of the mass flow controller, and a plurality of first valve subassemblies arranged across a plane extending substantially parallel to the first side of the mass flow controller, with valve movement perpendicular to the first side of the mass flow controller. The second manifold assembly includes a second end connection coupled to the second end port of the mass flow controller, wherein the second manifold assembly includes a second manifold body and a plurality of second valve subassemblies.

BRIEF DESCRIPTION OF THE DRAWINGS

Further advantages and benefits will become apparent to those skilled in the art after considering the following description and appended claims in conjunction with the accompanying drawings, in which:

FIG. 5A illustrates an upper perspective view of the multi-valve assembly of FIG. 5;

FIG. 15 schematically illustrates a gas distribution system having actuated valve manifolds oriented perpendicular to, or extending laterally from, a mass flow controller;

FIG. 16 illustrate a schematic view of a gas distribution system having actuated valve manifolds oriented parallel to a mass flow controller, in accordance with another exemplary embodiment of the present disclosure;

FIG. 17 illustrate a schematic view of another gas distribution system having actuated valve manifolds oriented parallel to a mass flow controller, in accordance with another exemplary embodiment of the present disclosure;

DETAILED DESCRIPTION OF EXEMPLARY EMBODIMENTS

Figure 1:
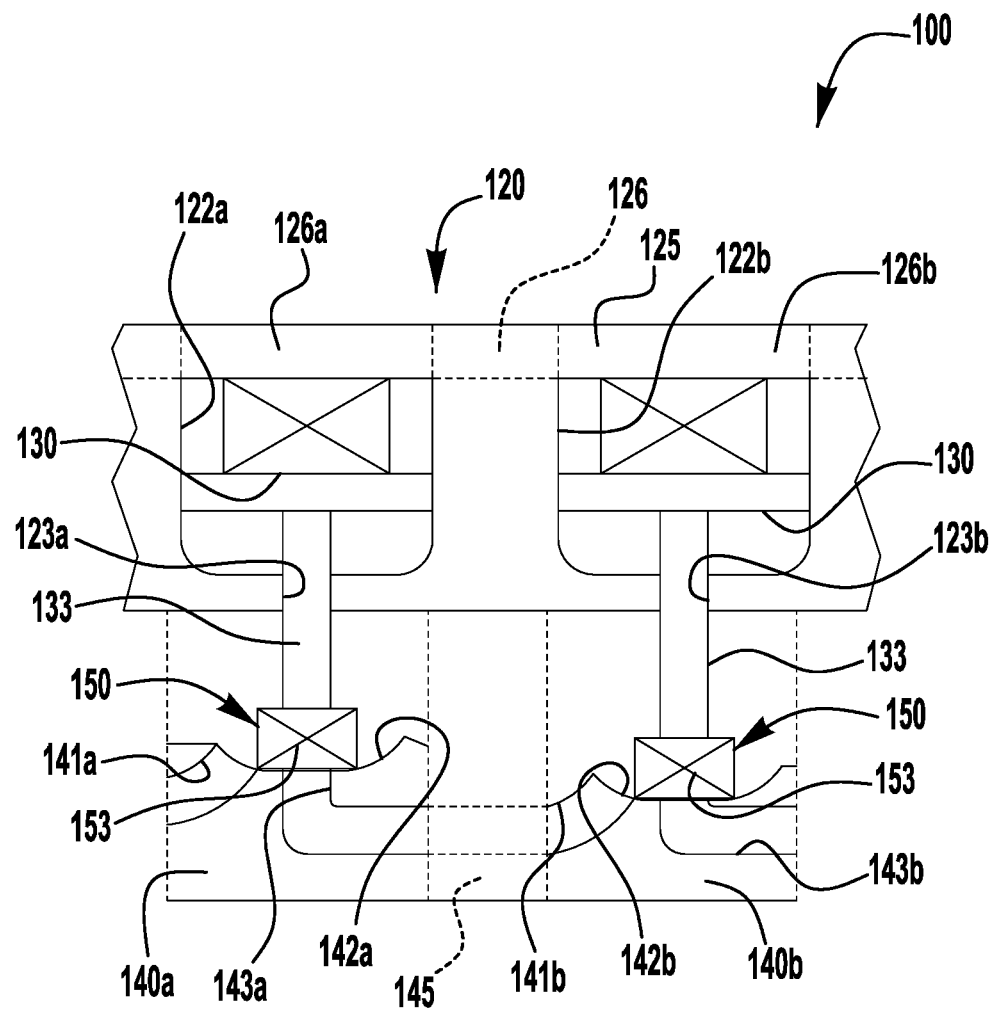
FIG. 1 illustrates a cross-sectional schematic view of a multi-valve assembly including an actuator manifold assembled with a plurality of valve segments, in accordance with an exemplary embodiment of the present disclosure.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present application describe normally closed (e.g., spring biased to a closed valve position) pneumatic actuator assemblies for multiple diaphragm valve manifolds, one of more of the features described herein may additionally or alternatively be applied to other types of actuators, including, for example, normally open (e.g., spring biased to an open valve position) actuator assemblies, double acting (e.g., fluid pressurized actuation in both directions) actuator assemblies, other types of remotely actuated actuator assemblies (e.g., hydraulic actuator, electric actuator, piezoelectric actuator, phase change actuator, shape memory alloy actuator), and manually operated (e.g., knob/handle operated) actuator assemblies. Further, one of more of the features described herein may additionally or alternatively be applied to use with other types of multiple valve manifolds (e.g., bellows valves, needle valves, etc.), single valve assemblies, and other fluid system components (e.g., pressure regulators, filters, etc.). Additionally, while the geometries and arrangements of many of the manifold body features described herein are such that their production is facilitated by additive manufacturing, such as 3-D printing, other manufacturing methods may be utilized to fabricate body components having one or more of the features described herein, such as, for example, stacked plate assembly, machining, welding, brazing, and casting (e.g., investment casting, sand casting, lost wax casting), independently or in combination.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In the present disclosure, the term "vertical" is used to describe a direction substantially perpendicular to a base (or bottom) surface of the fluid component body, and the term "horizontal" is used to describe a direction substantially parallel to the base surface of the fluid component body. It is to be understood that the fluid component body may be mounted or arranged in any suitable orientation (e.g., with the base surface of the fluid component body extending substantially vertically, or at some other angle).

According to an exemplary aspect of the present disclosure, a multiple valve assembly may be provided with actuators (e.g., pneumatically operated actuators) disposed in a single, unitary housing block or manifold, providing a plurality of actuator cavities in which valve actuating mechanisms (e.g., pneumatic actuating mechanisms, hydraulic actuating mechanisms, electric actuating mechanisms, piezoelectric actuating mechanisms, phase change actuating mechanisms, shape memory alloy actuating mechanisms) are disposed. In some embodiments, the actuator housing may additionally include integrated porting or internal passages to supply actuating fluid to each of the plurality of actuator cavities, which may be arranged to simplify the supply of actuating fluid to the actuator manifold. For example, the internal passages may extend to integral connections (e.g., press-fit push-to-connect fittings) arranged on a common exterior surface of the actuator housing block. As another example, the internal passages may intersect with a lower portion of the actuator cavities for upward pressurized actuation of an actuating member (e.g., internal piston), for example, to eliminate the need for additional fluid passages and corresponding seals for the actuating arrangements.

FIG. 1 illustrates a cross-sectional schematic view of a multi-valve assembly 100 including an actuator manifold 120 assembled with a plurality of valve segments 140a, 140b, each including a valve subassembly 150, for independent actuation of a valve control element 153 (e.g., diaphragm, regulating stem, plug, ported ball, etc.) to control fluid flow through each of the plurality of valve segments. The actuator manifold 120 includes a housing 125 defining a plurality of actuator cavities 122a, 122b each retaining an actuating member 130 (e.g., fluid driven piston, motor, etc.) operable to drive an output shaft 133 of the actuating mechanism. The output shaft 133 extends through a lower bore 123a, 123b in the actuator cavity 122a, 122b and is movable (e.g., rotationally and/or axially) to actuate the corresponding valve control element 153 within the valve cavity 142a, 142b to control fluid flow between valve passages 141a, 143a, 141b, 143b.

The actuator cavities 122a, 122b may be enclosed by cover portions 126a, 123b, for example, to protect the actuating member 130 from moisture or other contamination, and/or to define actuation limits of the actuating mechanisms (e.g., defining a piston stop). While the cover portions 126a, 126b may be formed from separate components (e.g., individual caps or plates), in another embodiment, the cover portions are defined by a cover plate 126 assembled with the actuator housing 125, for example, by fasteners installed through aligned mounting holes (not shown) in the actuator housing and cover plate.

While the valve segments 140a, 140b may be formed from separate valve bodies individually assembled with the actuator housing 125, in another embodiment, the valve segments 140a, 140b are integrated portions of a multi-valve manifold 140 and defined by a valve manifold body 145 assembled with the actuator housing 125, for example, by fasteners installed through aligned mounting holes (not shown) in the actuator housing 125 and valve manifold body 145. Many different types of multi-valve manifold bodies may be utilized. Exemplary multi-valve manifold bodies are shown and described in co-pending U.S. patent application Ser. No. 16/445,365, the entire disclosure of which is incorporated herein by reference.

Figure 2:
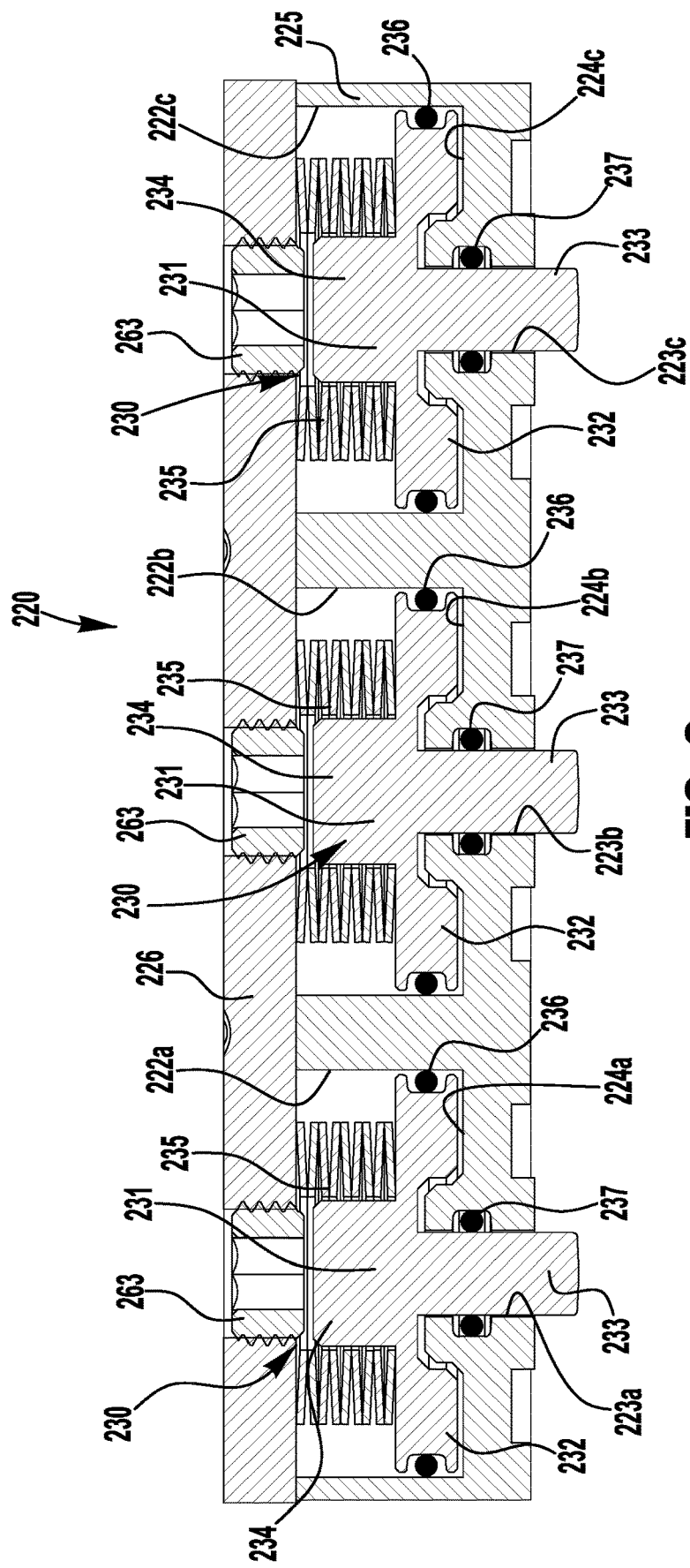
FIG. 2 illustrates a side cross-sectional view of an actuator manifold assembly, in accordance with an exemplary embodiment of the present disclosure.
Figure 3:
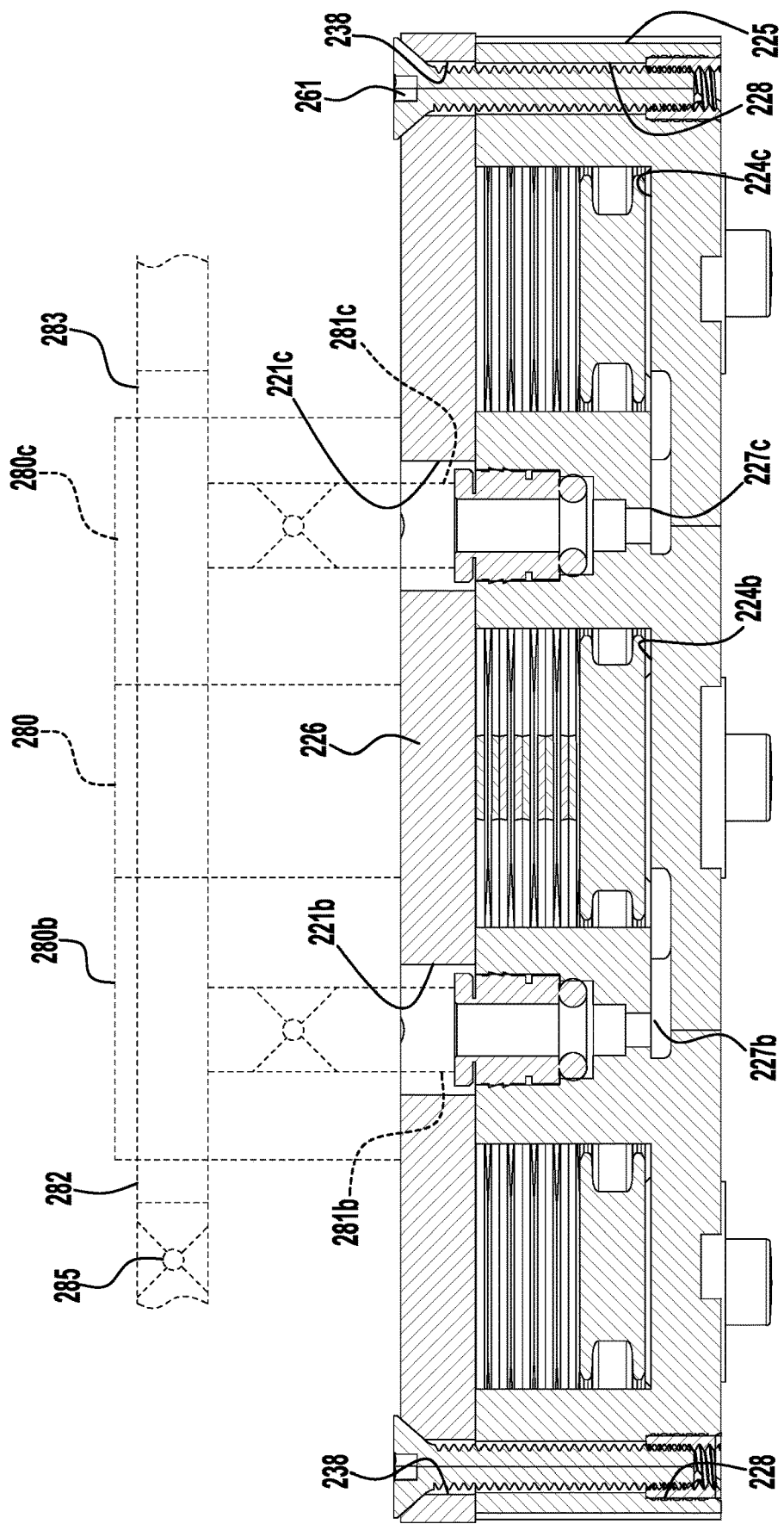
FIG. 3 illustrates another side cross-sectional view of the actuator manifold assembly of FIG. 2, with the actuator housing shown in phantom to illustrate additional features of the actuator manifold assembly.

FIGS. 2 and 3 illustrate an exemplary pneumatically actuated actuator manifold 220, including an actuator housing 225 defining actuator cavities 222a, 222b, 222c for retaining a plurality of actuator arrangements or actuating mechanisms 230 for actuating corresponding valve arrangements, described in greater detail below. Each actuating mechanism 230 includes a piston 231 and a biasing member 235 (e.g., coil spring or stack of Belleville spring washers, as shown) applying a biasing force to the piston. The piston 231 includes a lower annular stop portion 232 seated in a recessed counterbore portion 224a, 224b, 224c of the actuator cavity 222a, 222b, 222c and an output shaft 233 extending through a lower bore 223a, 223b, 223c of the actuator cavity. O-ring seals 236, 237 are installed around the piston OD and output shaft 233 to provide a leak tight, pressure containing seal between the piston 231 and the actuator housing 225. The actuator cavities 222a, 222b, 222c are enclosed by cover portions 226a, 226b, 226c of a cover plate 226 assembled with the actuator housing 225 by fasteners 261 installed through aligned mounting holes 228, 238 in the actuator housing 225 and cover plate 226 (FIG. 3).

According to another aspect of the present disclosure, to operate the actuating mechanisms, the actuator housing may be provided with internal actuating fluid passages that intersect with lower portions of the actuator cavity counterbores to apply fluid pressure to a lower surface of the piston for upward movement of the piston against the biasing member(s). These actuating fluid passages may extend through the top end of the actuator manifold (e.g., through the cover plate) to for attachment of the actuator pressure lines to the exposed top surface of the actuator manifold. In the illustrated embodiment, as shown in FIG. 3, the actuator housing 225 includes integrated actuator inlet ports 221b, 221c extending to internal actuating fluid passages 227b, 227c intersecting with the recessed portions 224b, 224c of the actuator cavities 222b, 222c. Many different types of actuator inlet port fittings may be provided, including for example, as shown, push-to-connect fittings for plastic hose ends.

According to another aspect of the present disclosure, each actuating arrangement may be provided with a manually adjustable stop for user adjustment of the upper axial position of the piston, for example, to control fluid flow rate when the corresponding valve is opened. In the illustrated embodiment, the manually adjustable stops are defined by set screws 263 installed in the cover plate 226 in alignment with upper end portions 234 of the corresponding pistons 231, and threadably adjustable to position a lower surface of the set screw 263 to abut the upper end portion 234 when the actuator arrangement 230 is actuated, thereby limiting fluid pressurized (e.g., upward) movement of the piston 231.

Figure 4:
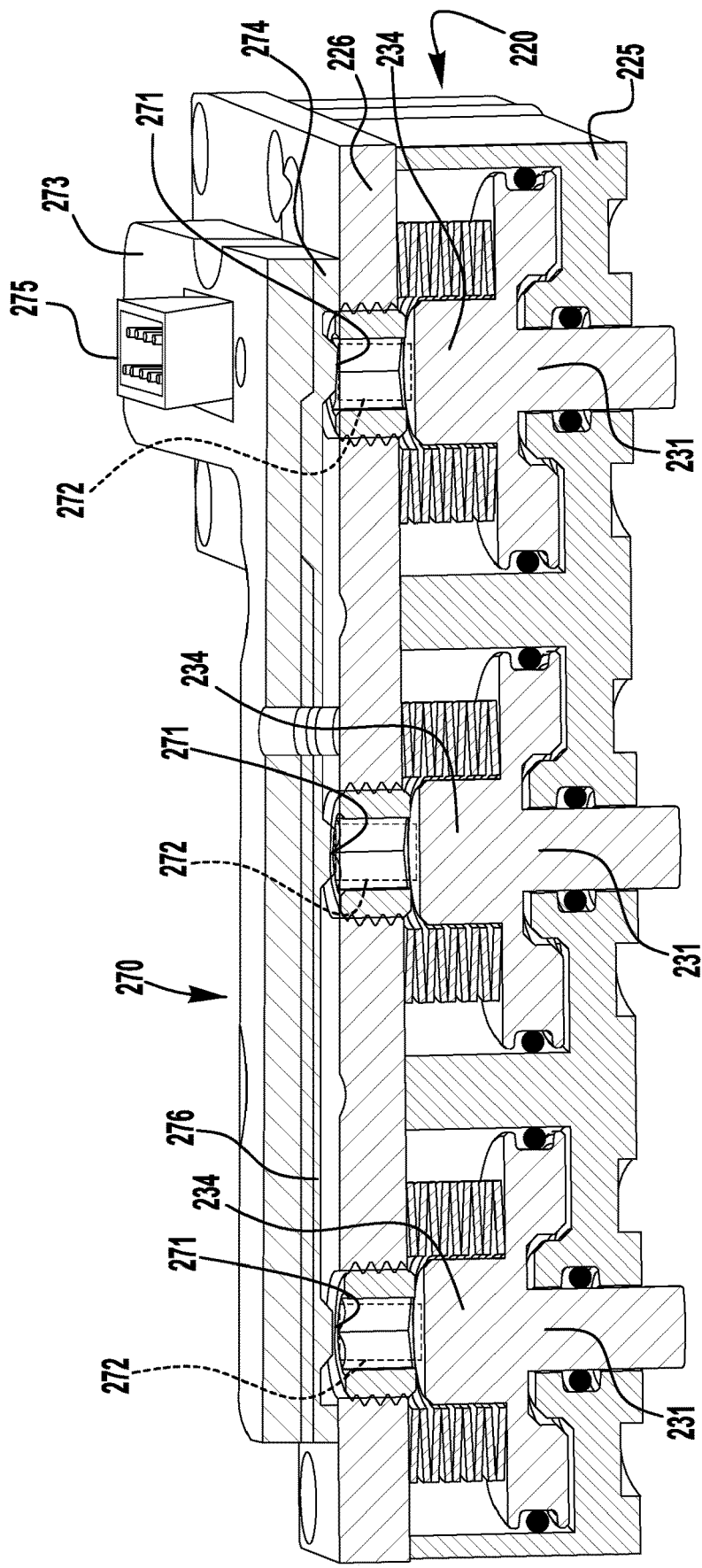
FIG. 4 illustrates a cross-sectional view of an actuator manifold assembly with a sensor manifold, in accordance with another exemplary embodiment of the present disclosure.

According to another aspect of the present disclosure, each actuator arrangement may be provided with a sensor configured to detect a position of the corresponding piston, for example, to identify a biased/return actuator position (e.g., corresponding to a closed valve position) or a pressurized/actuated actuator position (e.g., corresponding to an open valve position). In one such embodiment, as shown in FIG. 4, a sensor board or sensor manifold 270 may be assembled with the actuator manifold 220 to provide a position sensor 271 for each of the actuator arrangements 230, and circuit communication between the position sensors and a single electrical connector or data port 275. For example, the position sensors may be actuated (e.g., mechanical, magnetic, or proximity switch actuation) by pins or other such inserts (shown schematically at 272) disposed between the sensors 271 and the upper end portions 234 of the pistons 231 (e.g., extending through set screws) or may be actuated directly by the upper portions of the pistons (not shown). In the illustrated embodiment, the sensor manifold 270 includes upper and lower plates 273, 274 between which a membrane switch layer 276 is sandwiched. The sensors 271 (extending through holes in the lower plate 274) and data port 275 (extending through a hole in the upper plate 273) are carried by the membrane switch layer 276, and circuitry (not shown) on the membrane switch layer connects the sensors 271 with the data port 275, for example, to provide a single wired connection between the position sensors 271 and an external device.

According to another aspect of the present disclosure, the aligned positioning of the actuator inlet ports on the actuator manifold may facilitate connectivity with directly mounted solenoid pilot valves for independent and/or automatic control of each of the actuator arrangements. In one such embodiment, the solenoid pilot valves may be connected in parallel to provide for a single supply port and/or exhaust port for the assembly. As one example, a solenoid manifold, having a series of parallel pilot valves, may be mounted to the actuator manifold to provide a compact arrangement for actuating each of the actuating mechanisms of the actuator manifold, while provided a single connection to a source of pressurized actuating fluid (e.g., air, nitrogen). FIG. 3 schematically illustrates solenoid valves or pilot valves 280b, 280c (which may be separate valves or part of a solenoid manifold assembly 280) directly mounted (e.g., by bolts or other fasteners) to the housing 225 or cover plate 226 of the actuator manifold 220, with solenoid outlet ports 281b, 281c connected to the actuator inlet ports 221b, 221c. The solenoid pilot valves 280b, 280c may be connected in parallel to provide for a single supply port 282 and exhaust port 283 for the assembly. A shutoff valve 285 (e.g., toggle valve) may be connected with the supply port 282, for example, to disable the entire actuator assembly. Alternatively, for a non-linear arrangement of actuator inlet ports on an actuator manifold body, separate solenoid pilot valves may be directly mounted (e.g., by bolts or other fasteners) to actuator inlet ports (not shown) disposed on a top surface of the actuator manifold (e.g., on an actuator cover plate). One example of a direct mounted solenoid valve is the Bullet Valve®, manufactured by MAC Valves, Inc. In one such embodiment (not shown), the actuator housing block and/or cover plate may be provided with cavities sized to partially or fully receive the solenoid valves within the actuator housing.

Many different types of multiple valve arrangements may be utilized with an integrated actuator manifold, as described in the present disclosure. In an exemplary embodiment, a multiple diaphragm valve manifold arrangement is assembled with an integrated multiple pneumatic actuator manifold. FIGS. 5-9 illustrate various views of an exemplary seven-valve manifold assembly 300 including a multi-actuator manifold 320 (which may be similar to the actuator manifold 220 of FIGS. 2-4) having an actuator housing 325 (see FIG. 8) assembled with a manifold valve body 345 of a multiple valve manifold 340. In other embodiments, a different number of valves may be provided.

Figure 7:
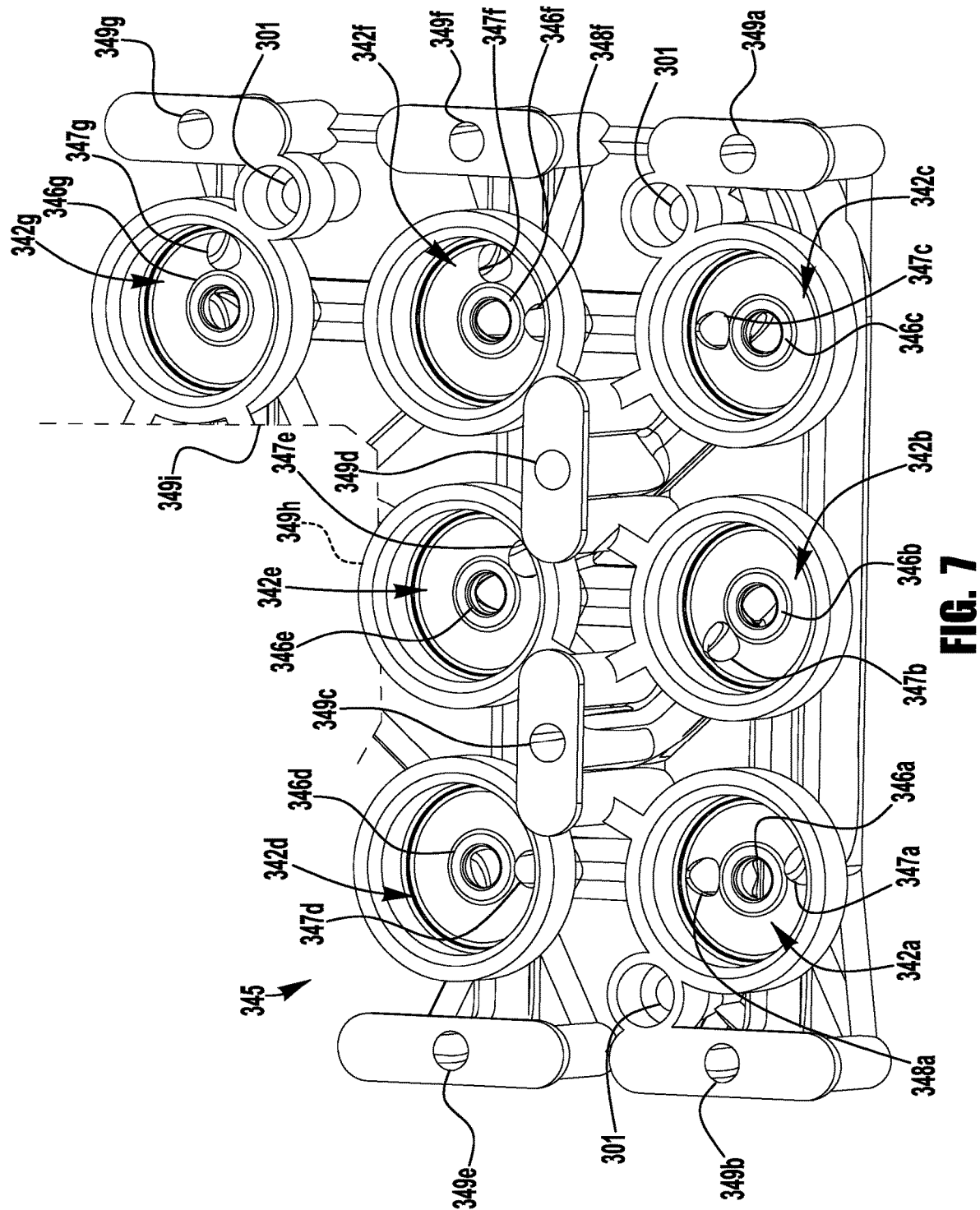
FIG. 7 illustrates an upper perspective view of the valve manifold body of the multi-valve assembly of FIG. 5.
Figure 8:
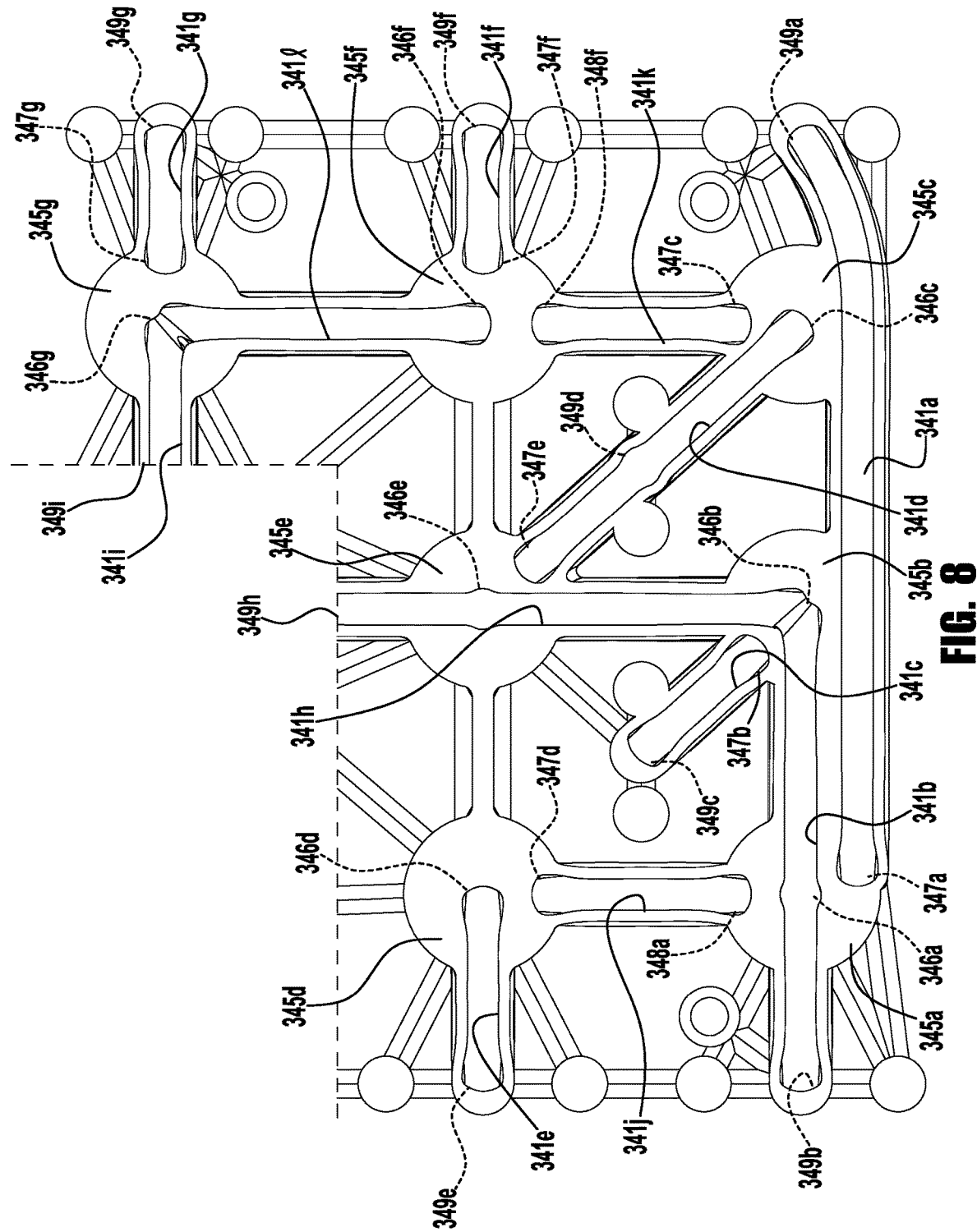
FIG. 8 illustrates a top cross-sectional view of the valve manifold body of the multi-valve assembly of FIG. 5.

As shown in FIG. 7, the exemplary manifold valve body 345 includes seven valve body segments 345a-g each having an upper perimeter wall portion defining a valve cavity 342a-g, and a lower base portion defining central flow ports 346a-g and offset flow ports 347a-g, 348a, 348f, and a plurality of flow passages 341a-ℓ extending between the flow ports 346a-g, 347a-g, 348a, 348f and valve end ports 349a-i connectable to a fluid system (e.g., by welding, fitting connections, etc.).

The valve flow ports 346a-g, 347a-g, 348a, 348f and valve end ports 349a-i may be connected using a variety of flow passage patterns or arrangements. In the illustrated embodiment, as shown in the cross-sectional view of FIG. 8, a first flow passage 341a extends between a first end port 349a and an offset flow port 347a of the first valve body segment 345a. A second flow passage 341b extends between a second end port 349b and central flow ports 346a, 346b of the first and second valve body segments 345a, 345b. A third flow passage 341c extends between a third end port 349c and an offset flow port 347b of the second valve body segment 345b. A fourth flow passage 341d extends between a fourth end port 349d, a central flow port 346c of the third valve body segment 345c, and an offset flow port 347e of the fifth valve body segment 345e. A fifth flow passage 341e extends between a fifth end port 349e and a central flow port of the fourth valve body segment 345d. A sixth flow passage 341f extends between a sixth end port 349f and an offset flow port 347f of the sixth valve body segment 345f. A seventh flow passage 341g extends between a seventh end port 349g and an offset flow port 347g of the seventh valve body segment 345g. An eighth flow passage 341h extends between an eight end port 349h and central flow ports 346b, 346e of the second and fifth valve body segments 345b, 345e. A ninth flow passage 341i extends between a ninth end port 349i and the central flow port 346g of the seventh valve body segment 345g. A tenth flow passage 341j extends between another offset flow port 348a of the first valve body segment 345a and an offset flow port 347d of the fourth valve body segment 345d. An eleventh flow passage 341k extends between offset flow ports 347c, 348f of the third and sixth valve body segments 345c, 345f. A twelfth flow passage 341ℓ extends between the central flow ports 346f, 346g of the sixth and seventh valve body segments 345f, 345g.

As shown, the first through seventh end ports 349a-g extend vertically, laterally offset from the actuator housing 325, to provide for coplanar fluid system connections (e.g., modular C-seal connections). While the eighth and ninth end ports 349h, 349i are show as laterally extending, truncated conduit ends, these end ports may also extend vertically, laterally offset from the actuator housing 325.

As shown in FIG. 7, apertured mounting bosses 301 may be provided to facilitate mounting of the manifold body 345 within a system (e.g., to a plate or other such base component of a fluid system). As shown, the mounting bosses may be joined or fused with an adjacent perimeter wall portion of one of the valve segments to facilitate manufacturing, to reduce overall size of the manifold body 345 and/or to strengthen or reinforce these joined portions. The mounting bosses 301 may additionally be provided with tapers and/or counterbores, for example, to facilitate centering the head of the installed fastener (e.g., mounting screw, not shown).

In the illustrated embodiment, valve arrangements or subassemblies 350 are installed within the valve cavities 342a-g of the valve manifold body 345. Many different types of valve arrangements may be utilized. In the illustrated embodiment, as shown in the cross-sectional view of FIG. 6, the exemplary valve subassemblies 350 each include a flexible diaphragm 353 and an annular seat carrier 352 received in the valve cavity 342a-g. The seat carrier 352 includes a lower seal portion 354 that seals against a recessed surface 344a-g around a central port 346a-g and an upper seal portion or valve seat 355 that seals against the diaphragm 353 when the diaphragm is moved to the closed position. The diaphragm 353 may, but need not, be welded to the seat carrier 352 (e.g., around an outer periphery of the diaphragm and seat carrier), for example, to retain the diaphragm with the seat carrier as a subassembly. A threaded retainer 356 is installed in the valve cavity 342a-g to clamp the seat carrier 352 and diaphragm 353 against the recessed surface 344, with an outer male threaded portion of the retainer 356 mating with an inner female threaded portion of the valve cavity 342a-g.

The actuator manifold 320 includes a plurality of actuator arrangements or actuating mechanisms 330 for actuating the valve arrangements 350, each disposed in an actuator cavity 322a-g in the actuator housing 325. Many different types of actuator arrangements may be utilized. In the illustrated embodiment, as shown in the cross-sectional view of FIG. 6, the exemplary actuator subassemblies 330 each include a piston 331 and a biasing member 335 (e.g., coil spring or Belleville spring washers, as shown). The piston 331 includes a lower annular stop portion 332 seated in a recessed counterbore portion 324a-g of the actuator cavity 322a-g and an output shaft 333 extending through a lower bore 323a-g of the actuator cavity for engagement with the valve arrangement 350, for example, engaging a button 359 to apply a closing force to the diaphragm 351 and against the valve seat. O-ring seals 336, 337 are installed around the piston OD and output shaft 333 to provide a leak tight, pressure containing seal between the piston 331 and the actuator housing 325. As shown, a cover plate 326 may be assembled with the actuator housing 325 to enclose the actuator cavities 322a-g. In other embodiments (not shown), separate cover plates or end caps may be provided for each actuator arrangement.

Each actuator arrangement 330 includes a manually adjustable stop defined by a set screw 363 installed in the cover plate 326 in alignment with upper end portions 334 of the corresponding pistons 331, and threadably adjustable to position a lower surface of the set screw 363 to abut the upper end portion 334 when the actuator arrangement 330 is actuated, thereby limiting fluid pressurized (e.g., upward) movement of the piston 331.

Figure 9:
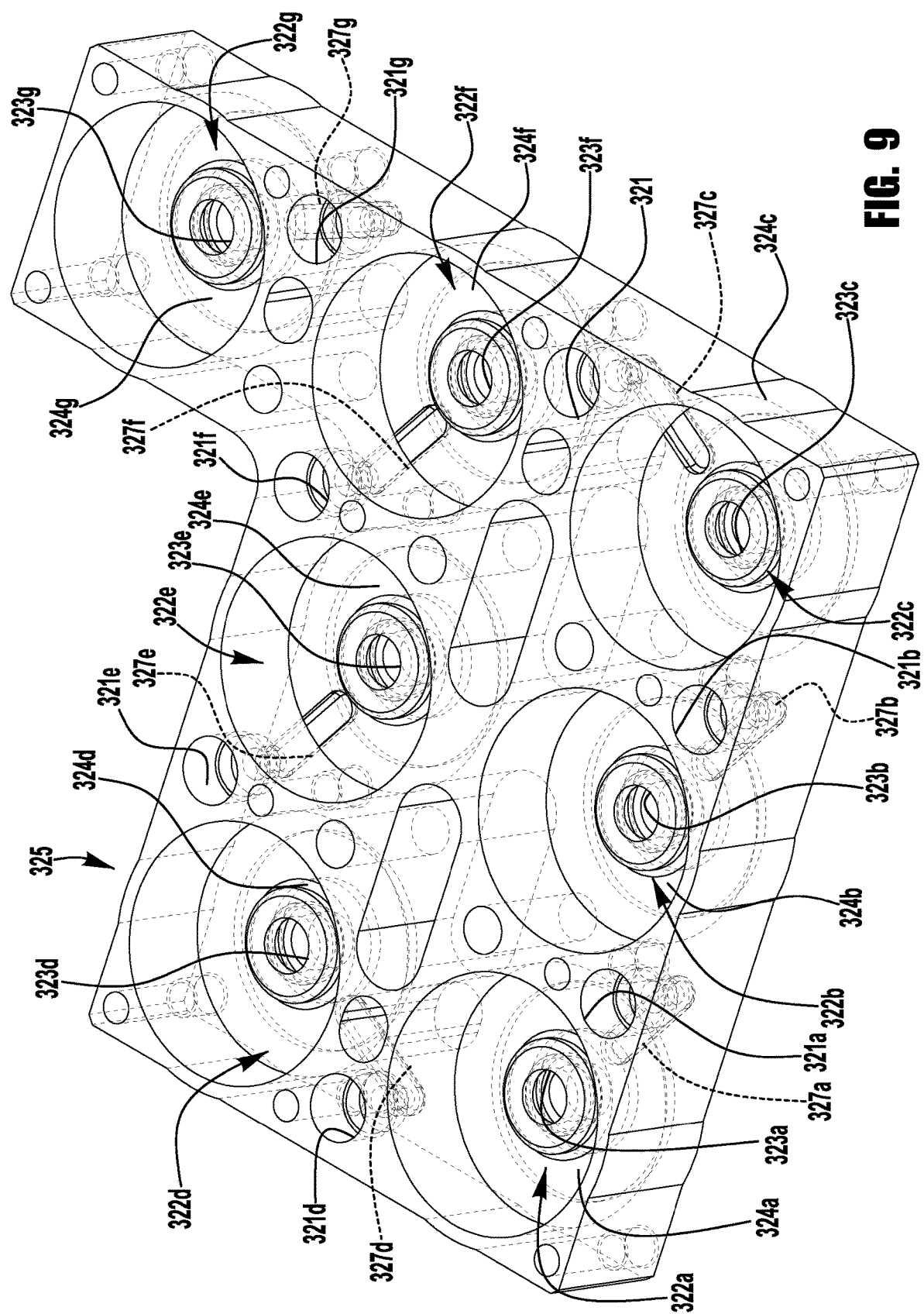
FIG. 9 illustrates an upper perspective view of the actuator manifold housing of the multi-valve assembly of FIG. 5, shown in phantom to illustrate additional features of the manifold housing.

As shown in FIG. 9, the actuator housing 325 includes integrated actuator inlet port connections 321a-g (aligned with openings in the cover plate 326) extending to internal actuating fluid passages 327a-g intersecting with the recessed portions 324a-g of the actuator cavities 322a-g. Many different types of actuator inlet port connections may be provided, including, for example, push-to-connect fittings for plastic hose ends. To actuate the valve arrangements 350 from the biased or return (e.g., closed) position to the pressurized or actuated (e.g., open) position, pressurized fluid is applied to the actuator inlet port connection 321a-g and through the internal actuating fluid passage 327a-g to apply fluid pressure to a lower surface of the piston 331 for upward movement of the piston against the biasing member(s) 335, to allow movement of the diaphragm 353 to an open position.

Figure 5:
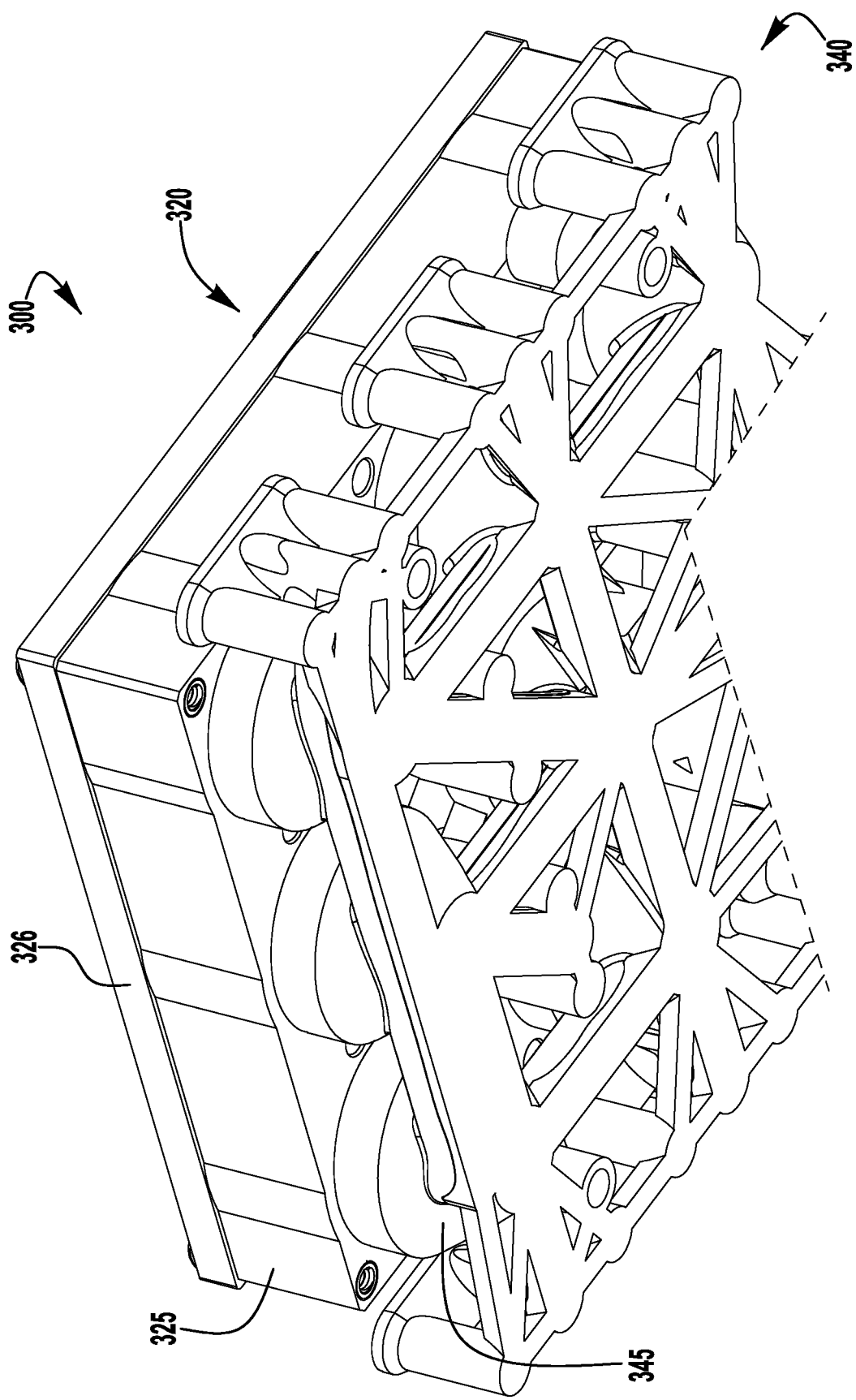
FIG. 5 illustrates a lower perspective view of a multi-valve assembly, in accordance with another exemplary embodiment of the present disclosure.
Figure 6:
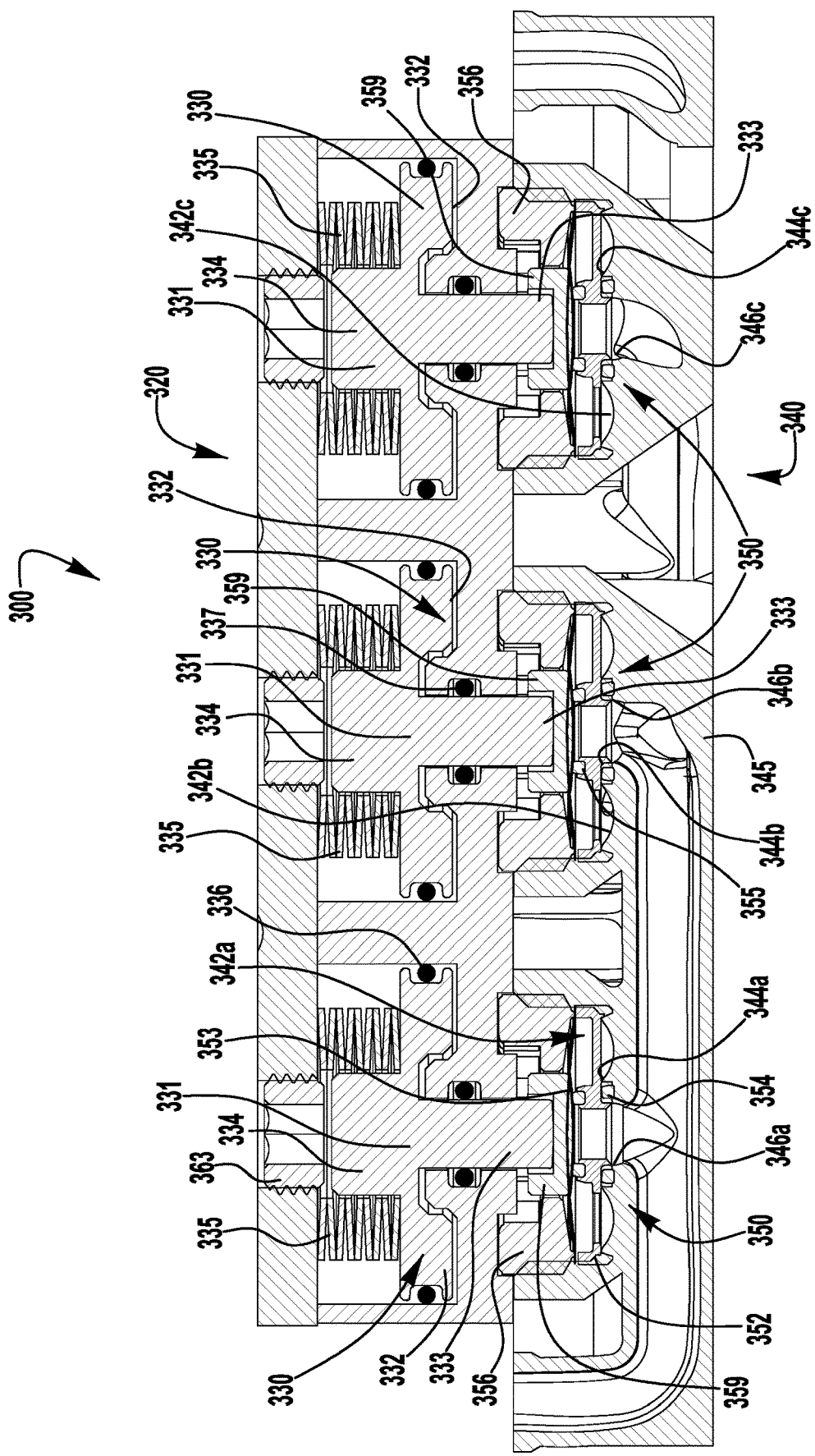
FIG. 6 illustrates a cross-sectional view of the multi-valve assembly of FIG. 5.
Figure 10:
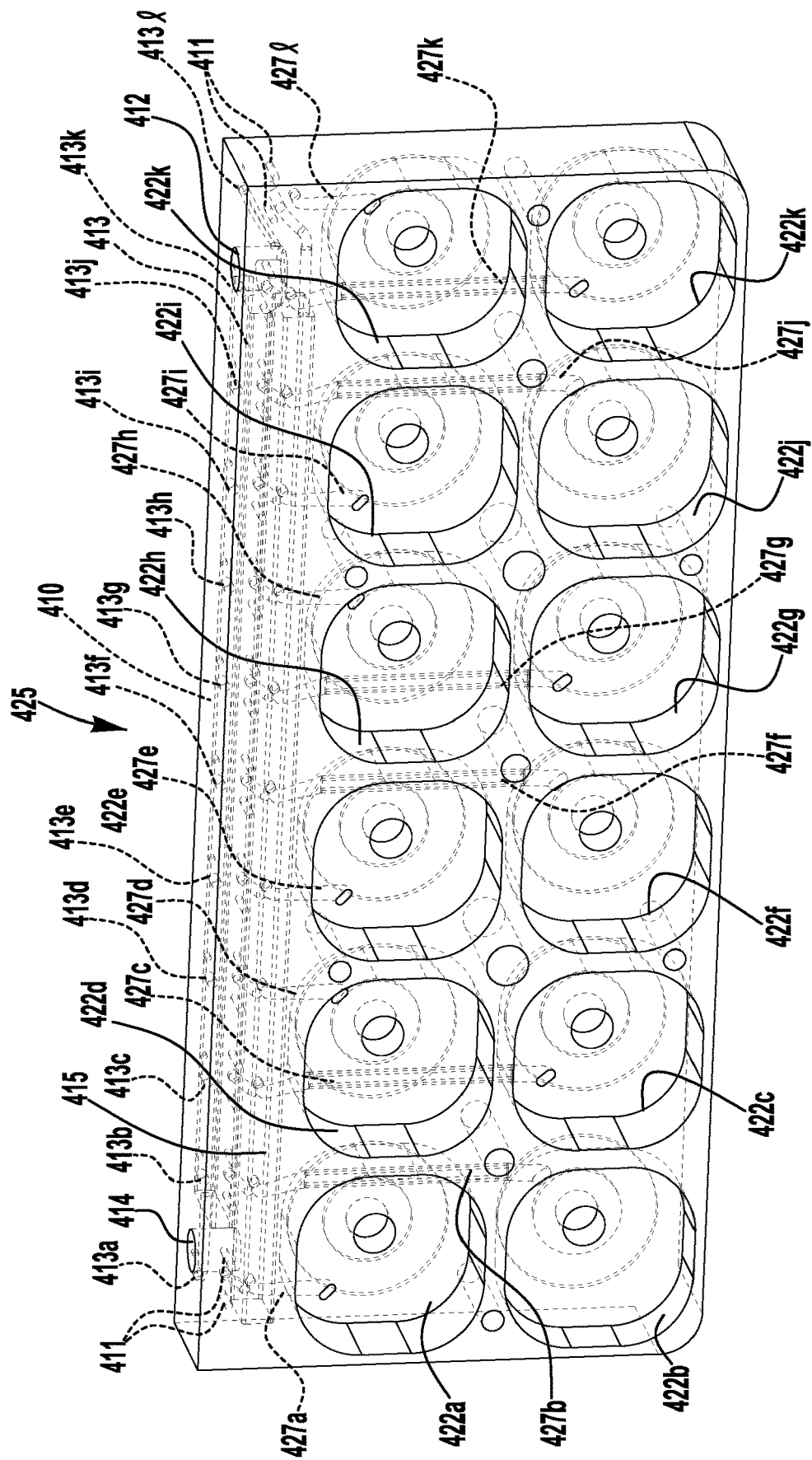
FIG. 10 illustrates a perspective phantom view of an actuator manifold housing including a mounting surface and internal actuating fluid passages arranged to accommodate a series of solenoid pilot valves, in accordance with another exemplary embodiment of the present disclosure.
Figure 11:
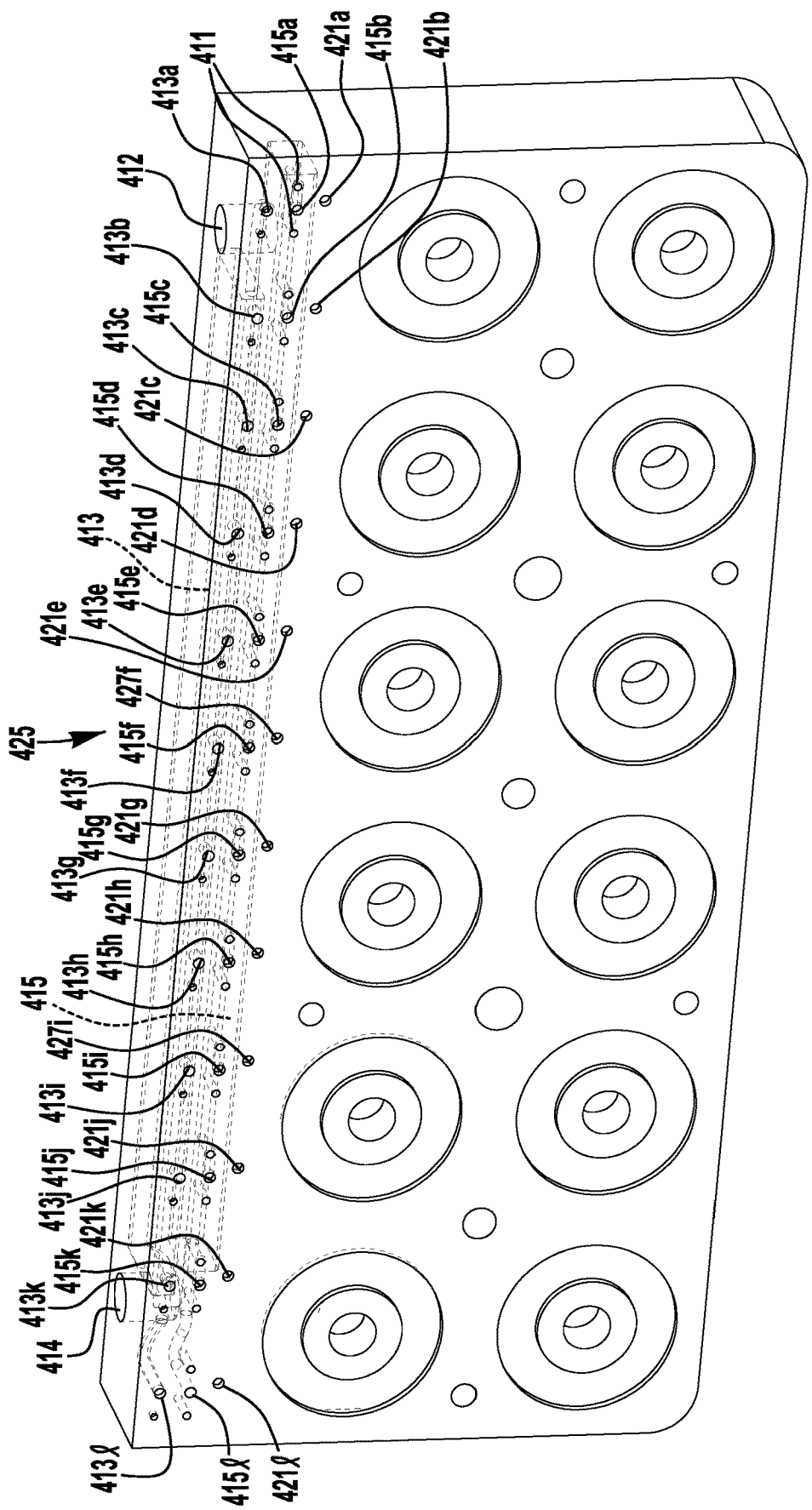
FIG. 11 illustrates another perspective phantom view of the actuator manifold housing of FIG. 10.
Figure 12:
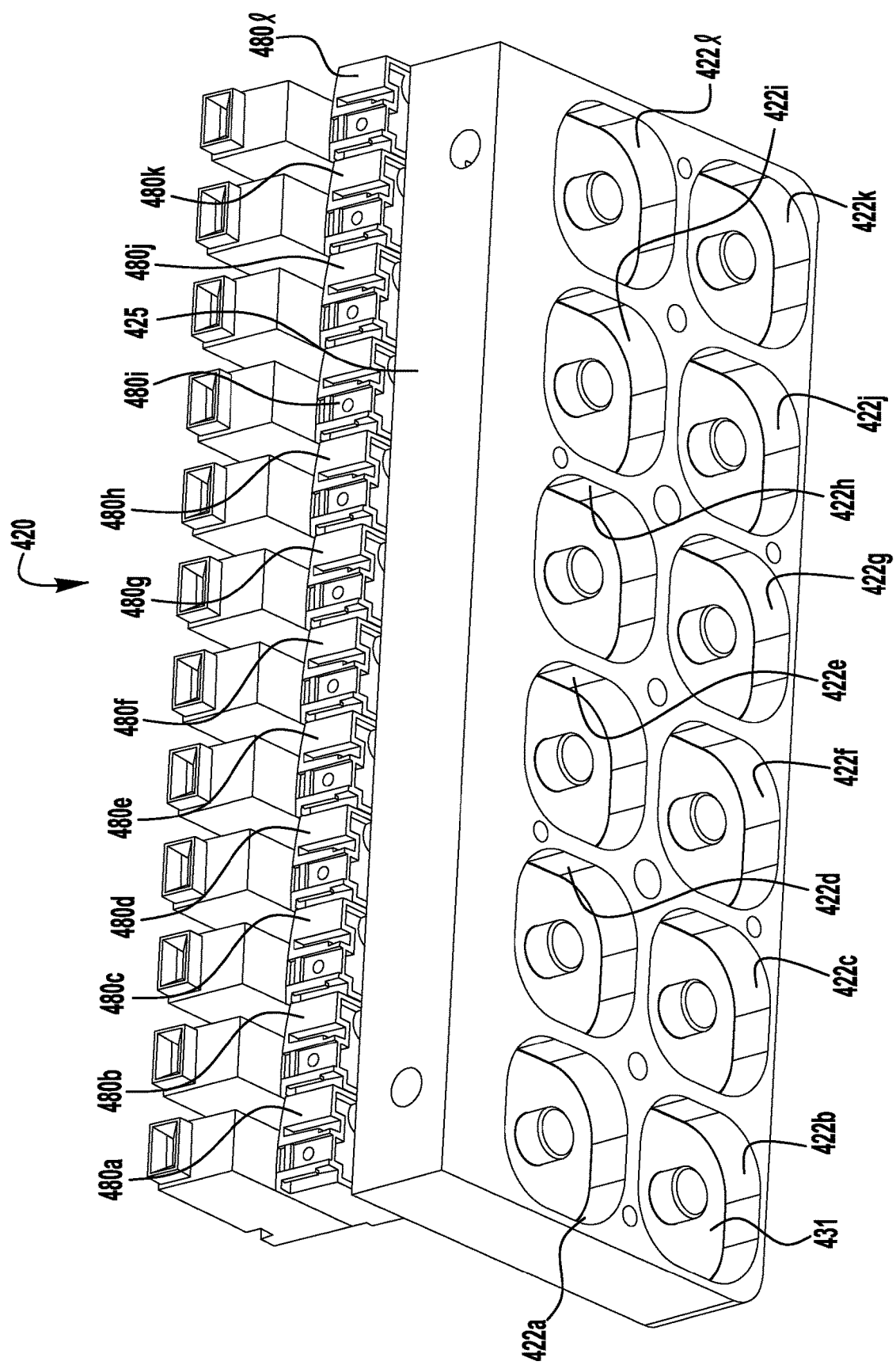
FIG. 12 illustrates a perspective view of the actuator manifold housing of FIG. 10, with installed actuating pistons and assembled with a series of solenoid piston valves.

In the embodiment of FIGS. 5-9, the actuator inlet port connections 321a-g are positioned in an array, with each port connection generally adjacent to the corresponding actuator cavity 322a-g, as shown in FIG. 5A. In other embodiments, an actuator manifold housing may be provided with internal actuating fluid passages extending to actuator inlet ports aligned in series along a mounting surface of the actuator manifold housing, to accommodate direct mounting of a series of solenoid pilot valves for compact, controlled actuation of the actuator arrangements. FIGS. 10-12 illustrate an exemplary actuator manifold housing 425 including a mounting surface and internal actuating fluid passages configured to accommodate a series of solenoid pilot valves for operation of a multi-valve manifold arrangement. While the illustrated actuator manifold housing 425 is configured for operation of a twelve valve manifold arrangement, in other embodiments, an actuator manifold may be configured for operation of a different number of valves.

As shown, the exemplary actuator manifold housing 425 includes twelve actuator cavities 422a-ℓ, recessed from a front side of the housing and arranged in a 2×6 array, to retain actuating arrangements. These cavities may be enclosed by a cover plate (not shown) mounted to the actuator manifold housing 425, similar to the embodiments of FIGS. 2-9. While the cavities may be shaped to accommodate circular pistons, similar to the embodiments of FIGS. 2-9, in the embodiment of FIGS. 10-12, the actuator cavities 422a-ℓ have a substantially square cross-sectional shape (e.g., with flat, equal sides and rounded corners), to accommodate substantially square shaped pistons 431 (FIG. 12), for example, to reduce the size of the actuator housing 425, by reducing spaces between the adjacent cavities, while maintaining a sufficient fluid-driven surface area of the pistons.

The actuator manifold housing 425 includes actuator inlet ports 421a-ℓ (FIG. 11) aligned in series along a mounting surface 410 on a rear side of the actuator manifold housing. The mounting surface 410 includes mounting holes 411 positioned for mounting (e.g., using bolts or other fasteners) a series of solenoid pilot valves 480a-ℓ (FIG. 12), to align outlet ports of the solenoid pilot valves with the actuator inlet ports 421a-ℓ. Internal actuating fluid passages 427a-ℓ extend from the actuator inlet ports 421a-ℓ to intersect with recessed or bottom portions of the actuator cavities 422a-ℓ, such that when each solenoid pilot valve 480a-ℓ is actuated (e.g., by an electric actuation signal) to an open position, pressurized fluid is transmitted through the corresponding actuating fluid passage 427a-ℓ to move the piston 431 within the corresponding actuator cavity 421a-ℓ to an actuated or pressurized position.

While the solenoid pilot valves may be independently or collectively (e.g., as a solenoid manifold) directly connected to a source of pressurized actuating fluid, in another embodiment, the actuator manifold may be provided with a pressurization port (e.g., for connection with a pressurized air line) connected with branching internal pressurization passages to supply pressurized actuating fluid to each of the solenoid pilot valves, thereby eliminating external fluid connections to the solenoid pilot valves. In the illustrated embodiment of FIG. 10, the actuator manifold housing 425 includes a pressurization port 412 connected with an internal pressurization passage 413 having branches 413a-ℓ extending to the mounting surface 410 to align with inlet ports of the mounted solenoid pilot valves 480a-ℓ. As shown, the exemplary actuator manifold housing 425 may additionally include a vent port 414 connected with an internal vent passage 415 having branches 415a-ℓ, extending to the mounting surface 410 to align with vent ports of the mounted solenoid pilot valves 480a-ℓ.

The overall shape and internal flow path arrangements of an actuator housing block may make it difficult to manufacture using conventional machining, molding, or casting techniques. According to an aspect of the present disclosure, the actuator housing block may be fabricated using additive manufacturing to produce a monolithic body having discrete, but partially joined or fused, valve segments and conduit segments. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition). Providing an actuator housing block as a single, monolithic component may eliminate assembly costs, reduce component wear, reduce adverse effects from heat cycling, improve corrosion behavior (galvanic effects, crevice, stress corrosion cracking), and reduce lead time to manufacture. Further, fabrication using additive manufacturing may reduce the amount of raw material used (e.g. stainless steel or other metals), and may reduce the size and weight of the finished body.

Figure 13:
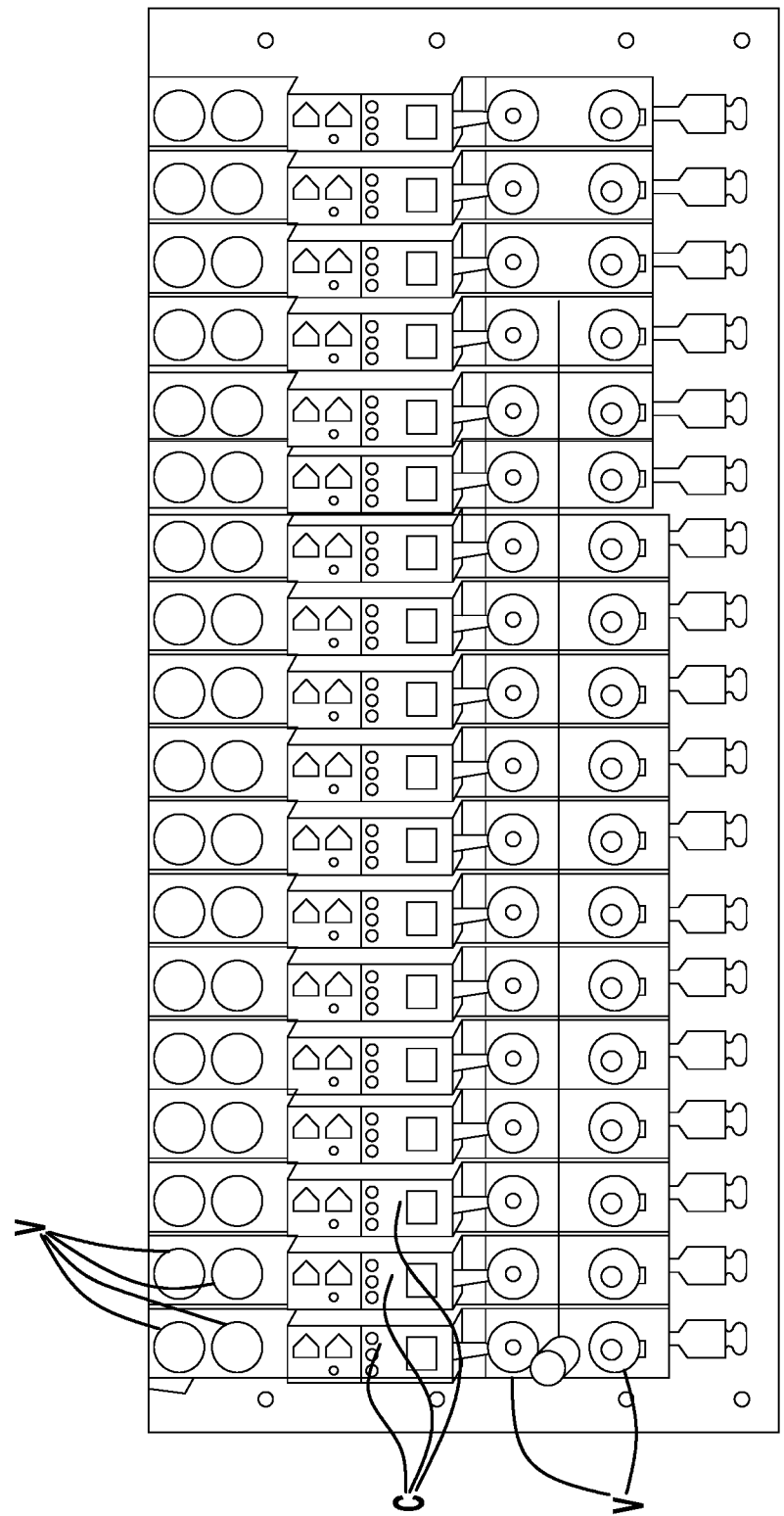
FIG. 13 illustrates a top plan view of an exemplary gas distribution system.
Figure 14:
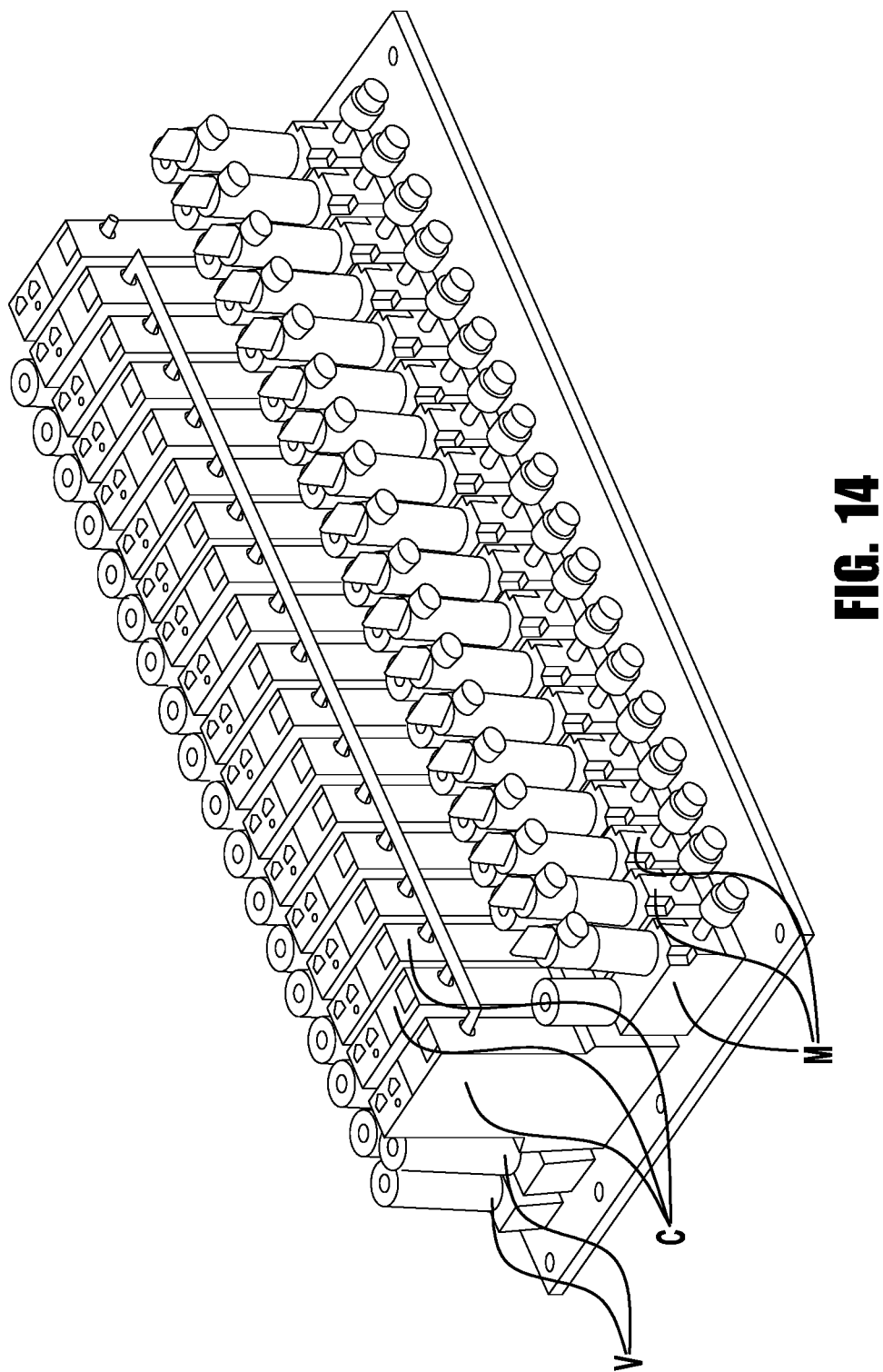
FIG. 14 illustrates a perspective view of another exemplary gas distribution system.
Figure 18:
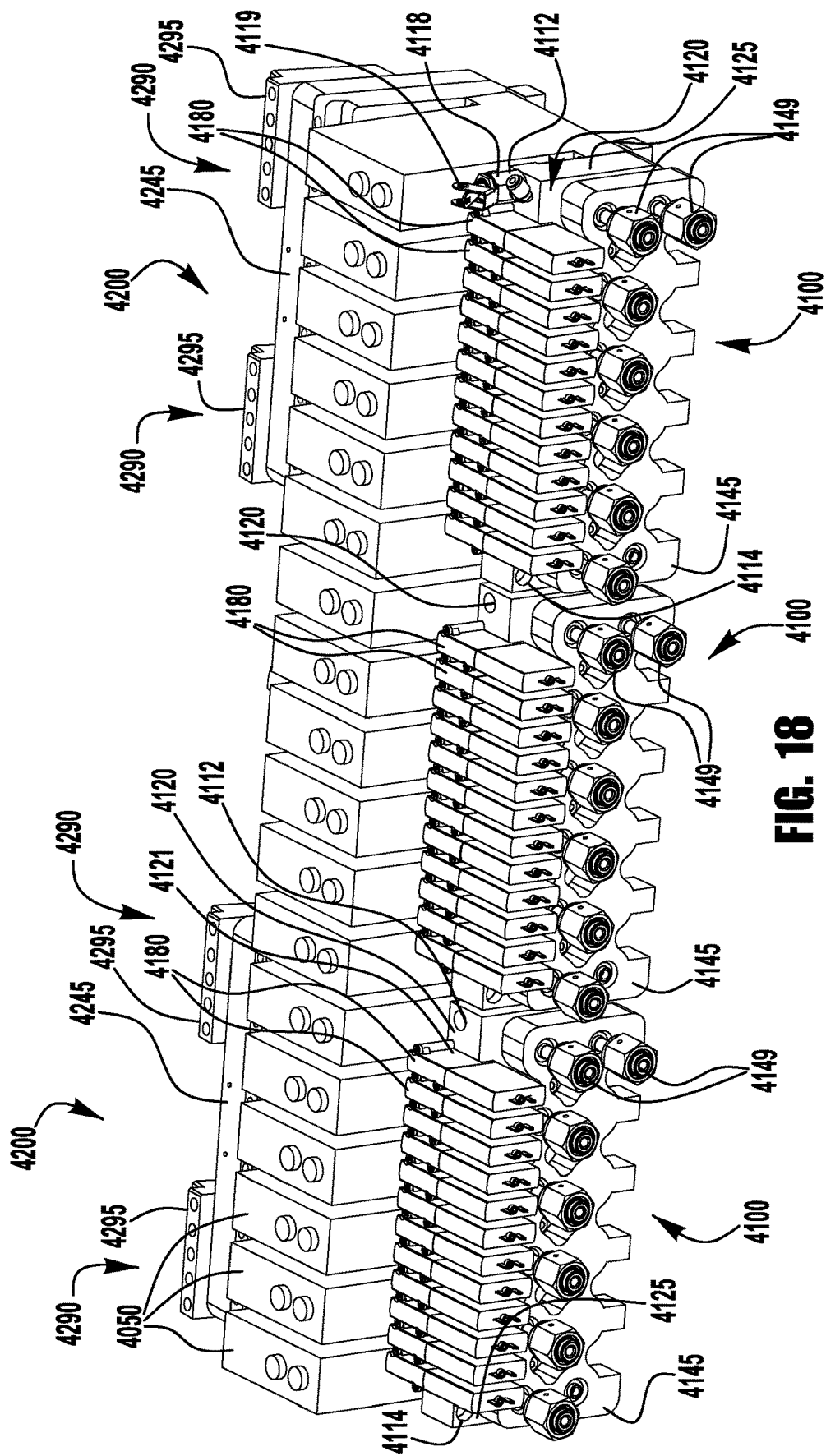
FIG. 18 illustrates a perspective view of a gas distribution system, in accordance with another exemplary embodiment of the present disclosure.
Figure 19:
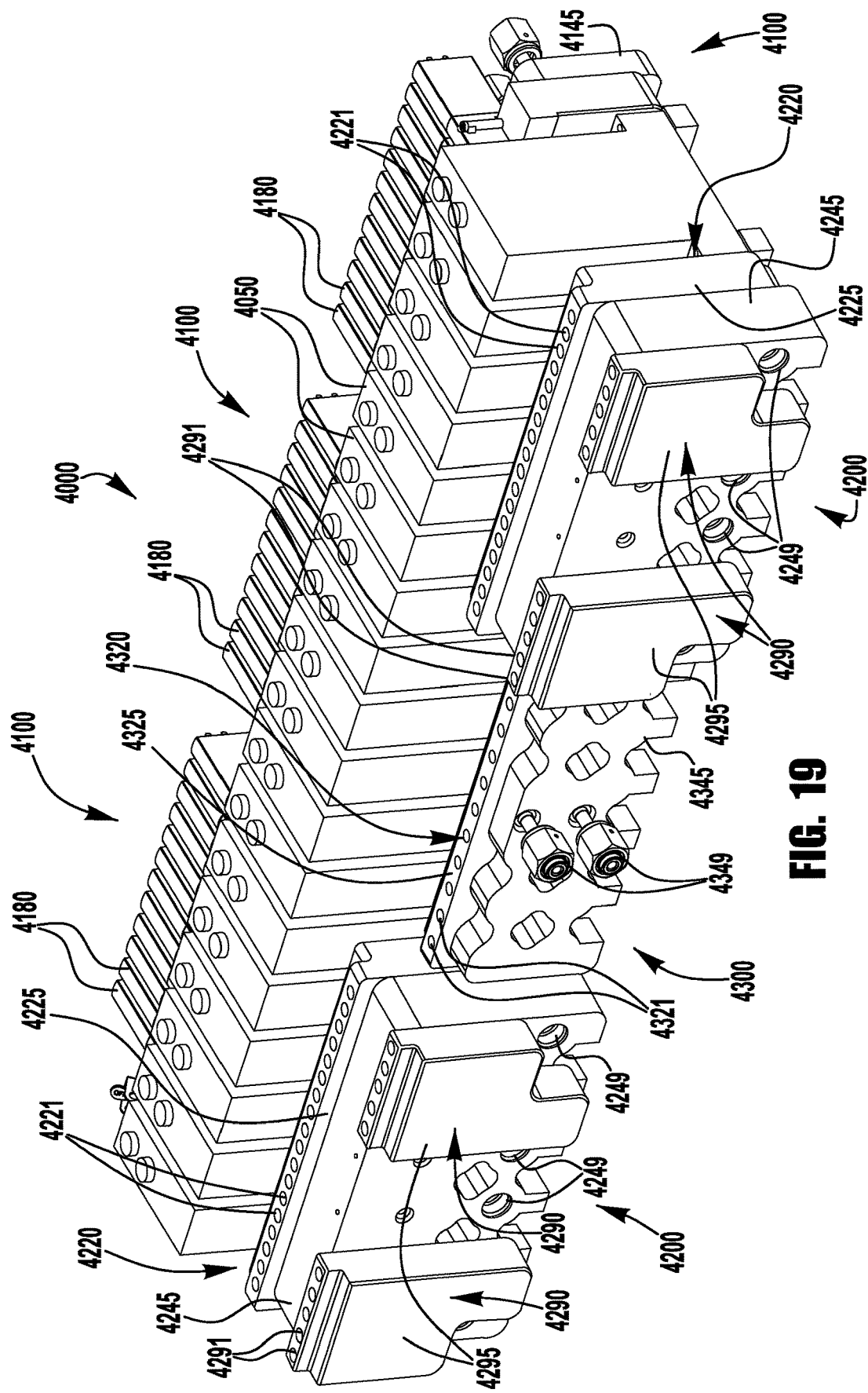
FIG. 19 illustrates another perspective view of the gas distribution system of FIG. 18.
Figure 20:
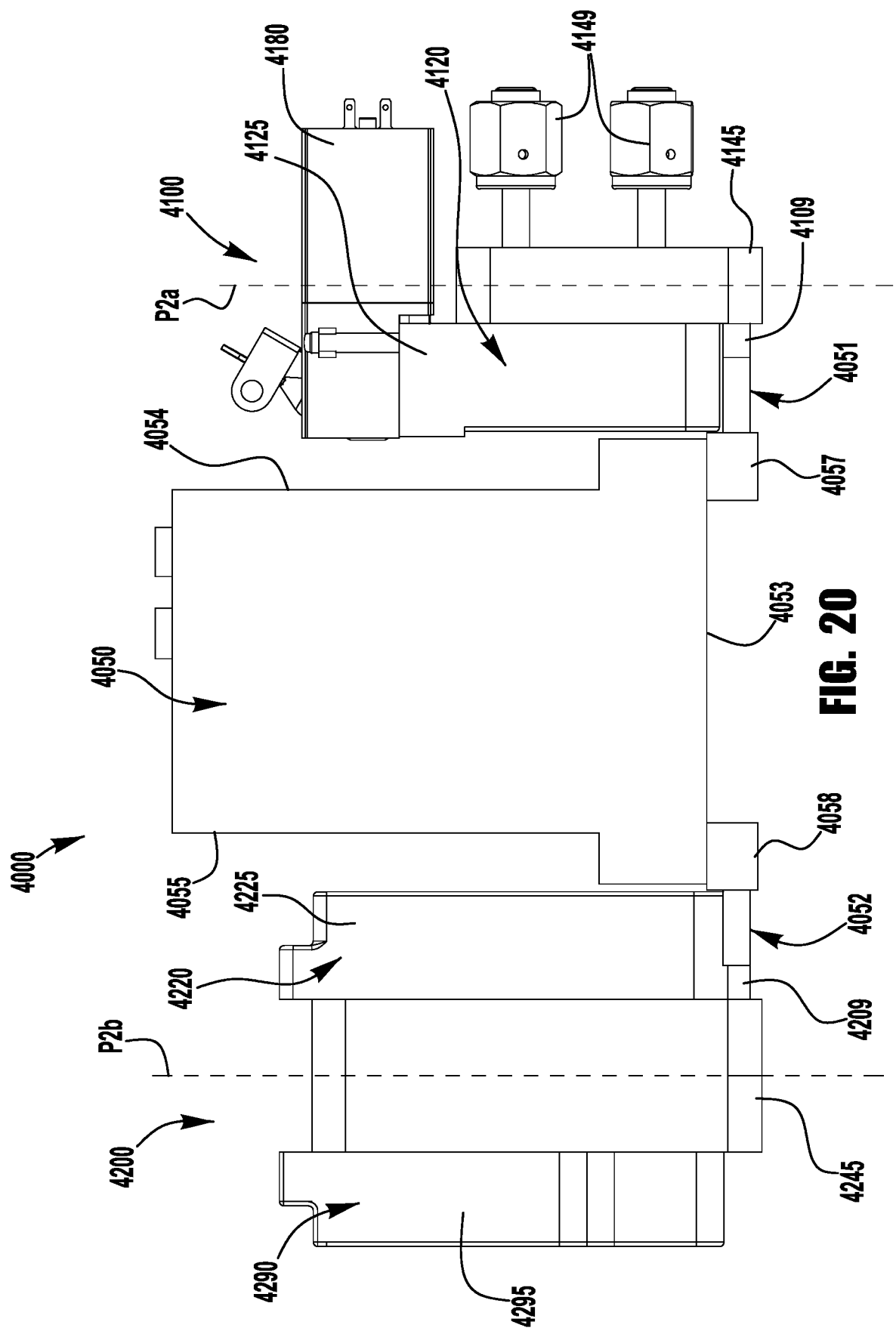
FIG. 20 illustrates an end view of the gas distribution system of FIG. 18.
Figure 21:
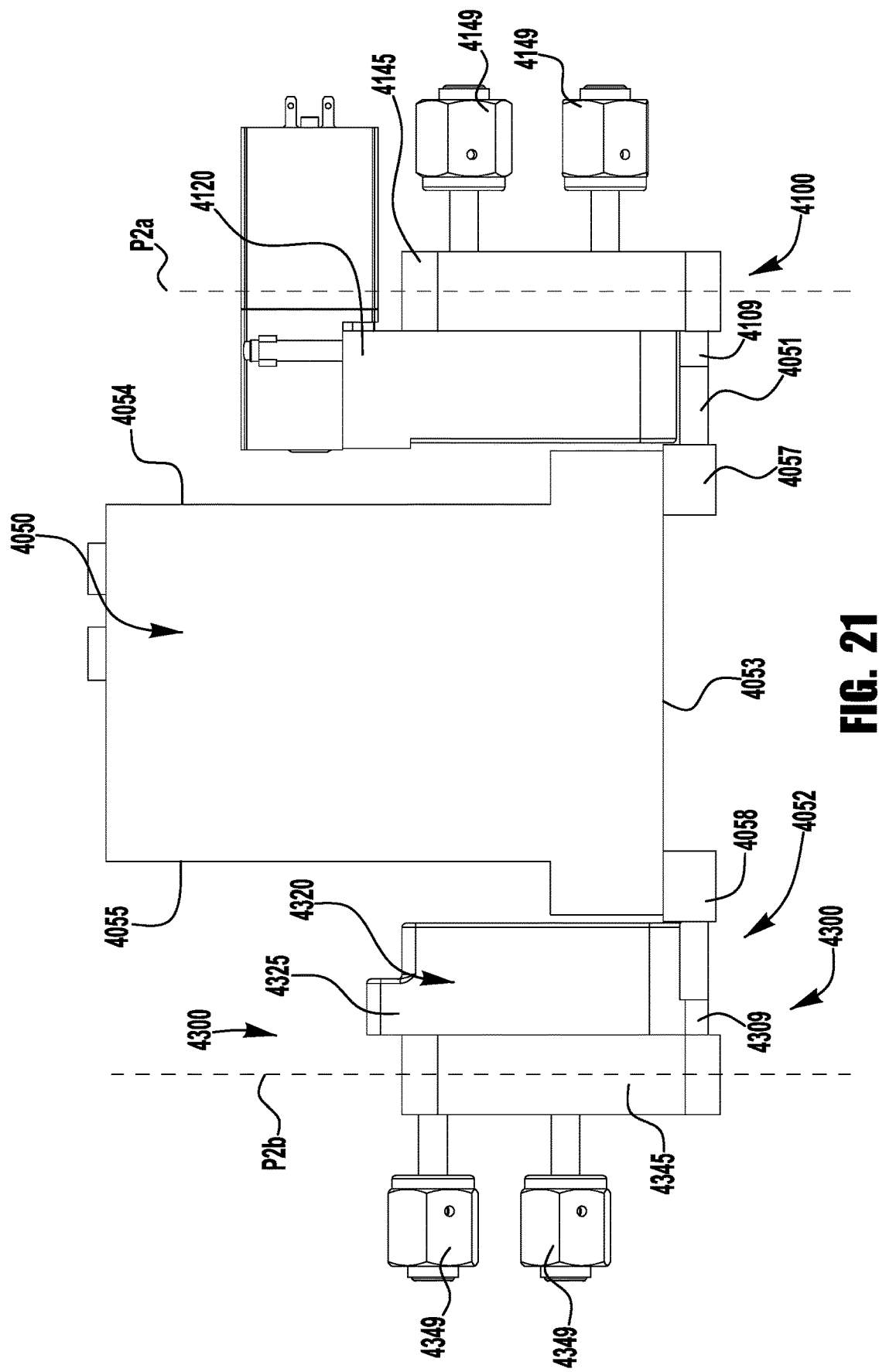
FIG. 21 illustrates an end view of a middle section of the gas distribution system of FIG. 18.

Many systems require a large number of valves and corresponding actuators, and would benefit from compact, manifold-based valve and actuator arrangements. For example, gas distribution systems, such as ultra-high purity (UHP) gas boxes, can require dozens of remotely operable valves (and corresponding actuators) installed upstream and downstream of one or more mass flow controllers (MFCs) for precise control of gas flow, for example, for semiconductor wafer processing. These assemblies can occupy a large footprint, having valves V extending laterally outward from a row of MFCs C, as shown in FIG. 13. The footprint of the system may be reduced by utilizing rows of multi-valve manifolds M, as shown in FIG. 14.

FIG. 15 schematically illustrates an exemplary fluid system 1000, including a MFC 1050 having first side ports 1051 and second side ports 1052 extending from a lower end or base 1053 of the MFC, proximate corresponding first and second sides 1054, 1055 of the MFC, for lateral flow through the MFC from the first side ports to the second side ports. A first manifold assembly 1100 includes first end connections 1109 coupled to the first side ports 1051 of the MFC 1050, and a second manifold assembly 1200 includes second end connections 1209 coupled to the second side ports 1052 of the MFC. The first and second manifold assemblies 1100, 1200 include manifold bodies 1145, 1245 that extend laterally outward from the MFC 1050 and include a plurality of valve subassemblies 1150, 1250 arranged along a plane P1 extending substantially parallel to the laterally extending base 1053 of the MFC (with valve movement perpendicular to the base of the MFC). Actuator arrangements 1120, 1220 (e.g., any of the actuator manifolds described herein) are assembled with upper ends of the manifold bodies 1145, 1245 for remote actuation of the manifold valve subassemblies 1150, 1250. Valve fluid passages 1141, 1241 extend to end ports 1149, 1249 that extend longitudinally from the manifold bodies 1145, 1245.

According to another exemplary aspect of the present application, a fluid distribution system (e.g., an ultra-high purity gas distribution system) including a fluid processing device (e.g., a mass flow controller) having a housing having a base defining a width extending laterally between first side (e.g., inlet) and second side (e.g., outlet) ports and first and second side walls defining a height greater than the width, may be provided with first side (e.g., inlet) and/or second side (e.g., outlet) valve manifold assemblies connected to the first side and second side ports of the housing and extending parallel to the first and second side walls of the housing. Such an arrangement may, for example, provide for a reduced footprint size of the fluid distribution by reducing the lateral extent of the valve manifold assemblies.

One such exemplary fluid system 2000, schematically illustrated in FIG. 15, includes a mass flow controller (MFC) 2050 having first side ports 2051 and second side ports 2052 extending from a lower end or base 2053 of the MFC, proximate corresponding first and second sides 2054, 2055 of the MFC, for lateral flow through the MFC from the first side ports to the second side ports. A first manifold assembly 2100 includes first end connections 2109 coupled to the first side ports 2051 of the MFC 2050, and a second manifold assembly 2200 includes second end connections 2209 coupled to the second side ports 2052 of the MFC. The first and second manifold assemblies 2100, 2200 include manifold bodies 2145, 2245 that extend along planes P2*a*, P2*b* parallel to the first and second sides 2054, 2055 of the MFC 2050, with actuator arrangements 2120, 2220 (e.g., actuator manifolds, as described herein) assembled with laterally outward facing sides of the manifold bodies. The manifold bodies 2145, 2245 enclose a plurality of valve subassemblies 2150, 2250, operated by the actuator arrangements 2120, 2220 and arranged along the vertical planes P2*a*, P2*b* (with valve movement perpendicular to the sides of the MFC). Valve fluid passages 2141, 2241 extend to end ports 2149, 2249 that extend longitudinally from the manifold bodies 2145, 2245. This arrangement reduces a lateral dimension of the fluid distribution system 2000, as compared to a fluid distribution system having valve assemblies extending laterally outward of the first and second sides of a MFC, as shown in FIG. 14.

In other embodiment, valve manifolds with laterally outward extending end ports may be desirable. FIG. 16 schematically illustrates an exemplary fluid system 3000 including a mass flow controller (MFC) 3050 having first side ports 3051 and second side ports 3052 extending from a lower end or base 3053 of the MFC, for lateral flow through the MFC from the first side ports to the second side ports. As shown, the side ports 3051, 3052 may extend laterally outward of the sides 3054, 3055 of the MFC 3050, for coupling with end connections 3109, 3209 of first and second manifold assemblies 3100, 3200. The first and second manifold assemblies 3100, 3200 include manifold bodies 3145, 3245 that extend along planes P2*a*, P2*b* parallel to, and spaced apart from, the first and second sides 3054, 3055 of the MFC 3050, to accommodate actuator arrangements 3120, 3220 (e.g., actuator manifolds, as described herein) assembled with laterally inward facing sides of the manifold bodies, and sandwiched between the MFC and the corresponding manifold body. The manifold bodies 3145, 3245 enclose a plurality of valve subassemblies 3150, 3250, operated by the actuator arrangements 3120, 3220 and arranged along the vertical planes P2*a*, P2*b* (with valve movement perpendicular to the sides of the MFC). Valve fluid passages 3141, 3241 extend to end ports 3149, 3249 that extend laterally outward from the manifold bodies 3145, 3245. In other embodiments, other arrangements may be provided, including, for example, a system having an inner lateral first manifold body with an outer lateral actuator manifold, and an outer lateral second manifold body with an inner lateral actuator manifold.

The arrangements described herein may provide for compact automated multi-valve arrangements including mass flow controllers and dozens of valves, actuators, and solenoids in an assembly that enables the use of fewer components, easier/faster installation, fewer connections, fewer potential leak points, and a smaller footprint size. FIGS. 18-21 illustrate various views of an exemplary gas distribution system 4000 for installation in an ultra-high purity gas box, according to another aspect of the present disclosure.

In the exemplary embodiment, the gas distribution system 4000 includes a bank of mass flow controllers (MFCs) 4050 including side ports 4051, 4052 connected with first (inlet) and second (outlet) sets of actuated manifolds assemblies, 4100, 4200, 4300. While such a system may be configured to utilize any number of fluid system components, the exemplary system 4000 includes eighteen MFCs 4050, three twelve-valve inlet manifolds 4100, two twenty-eight valve outlet manifolds 4200, and one twelve-valve outlet manifold 4300, for compact control of 104 valves.

As shown, the first (inlet) and second (outlet) side ports 4051, 4052 of the MFCs 4050 include elbow fittings 4057, 4058 (e.g., weld fittings) extending downward from the MFC base portions 4053 and laterally outward from the first and second sides 4054, 4055 of the MFC, to connect with end connections 4109, 4209, 4309 of the multi-valve manifolds 4100, 4200, 4300. The manifold assemblies 4100, 4200, 4300 include manifold bodies 4145, 4245, 4345 that extend along planes P2*a*, P2*b* parallel to, and spaced apart from, the first and second sides 4054, 4055 of the MFCs 4050, to accommodate actuator arrangements 4120, 4220, 4320 (e.g., actuator manifolds, as described herein) assembled with laterally inward facing sides of the manifold bodies. The manifold bodies 4145, 4245, 4345 enclose a plurality of valve subassemblies (not shown, but may be similar to the other valve subassemblies described herein), operated by the actuator arrangements 4120, 4220, 4320 and arranged along the vertical planes P2*a*, P2*b* (with valve movement perpendicular to the sides of the MFC). Valve fluid passages (not shown) extend to end ports 4149, 4249, 4349 disposed on outer lateral surfaces of the manifold bodies 4145, 4245, 4345.

The exemplary valve manifold actuator arrangements 4120, 4220, 4320 include actuator manifold housings 4125, 4225, 4325 having actuator inlet ports 4121, 4221, 4321 aligned in series along a surface 4110, 4210, 4310 of the actuator manifold housing, for connection with sources of pressurized actuating fluid. As shown with the actuator arrangements 4120 of the inlet manifold assemblies 4100 (but applicable to any of the actuator arrangements described herein), a series of solenoid pilot valves 4180 may be mounted to the actuator manifold surface 4110 to align outlet ports of the solenoid pilot valves with the actuator inlet ports 4121. As shown in the exemplary embodiments described herein, the actuator manifolds may be provided with internal actuating fluid passages extending from the actuator inlet ports to intersect with actuator cavities, for pressurized actuation of the actuator arrangement when the solenoid is energized. Additionally, similar to the embodiment of FIG. 10, the actuator manifold housing 4125 may include a pressurization port 4112 connected with an internal pressurization passage having branches extending to the mounting surface 4110 to align with inlet ports of the mounted solenoid pilot valves 4180, and a vent port 4114 connected with an internal vent passage having branches extending to the mounting surface 4110 to align with vent ports of the mounted solenoid pilot valves. As shown, a shutoff valve 4118 (e.g., toggle valve, as shown) may be connected with the pressurization port, for example, to disable the entire solenoid operated actuator assembly 4100. A lockout-tagout (LOTO) arrangement 4119 (e.g., a bracket that receives a locked padlock to block movement of the valve handle, as shown) may be assembled with the shutoff valve to facilitate lockout of the actuated system.

The exemplary twenty-eight-valve outlet manifolds 4200 include inner lateral valve subassemblies actuated by the inner lateral actuator arrangements 4220, and outer lateral valve subassemblies actuated by outer lateral actuator arrangements 4290 (including actuator manifold housings 4295 having actuator inlet ports 4291) mounted to the outer lateral surfaces of the manifold bodies 4245. The outer lateral actuator arrangements 4290 may cover limited portions of the outer lateral surfaces of the manifold bodies 4245, for example, to accommodate the end ports 4249.

Figure 22:
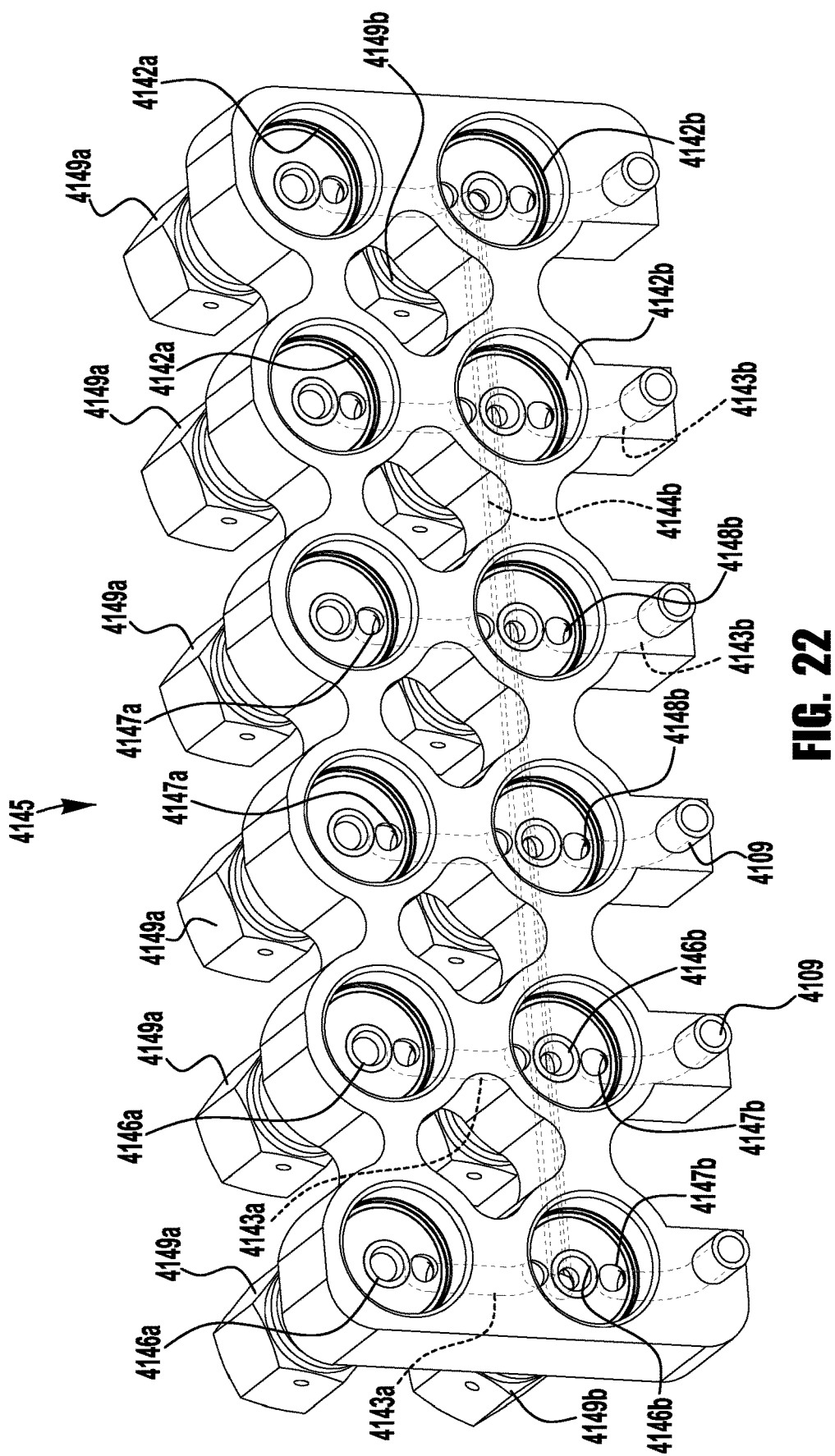
FIG. 22 illustrates a perspective view of an inlet valve manifold body of the gas distribution system of FIG. 18, shown in phantom to illustrate internal passages of the manifold body.

FIG. 22 illustrates an exemplary manifold body 4145 of an inlet manifold 4100 of the system of FIGS. 18-21. The manifold body 4145 includes inlet end ports 4149a having passages extending to central ports 4146a of supply valve cavities 4142a. An offset port 4147a of each supply valve cavity 4142a is connected to a first offset port 4147b of a corresponding bleed valve cavity 4142b by a connecting passage 4143a. A central port 4146b of each bleed valve cavity 4142b is connected to a bleed passage 4144b that extends between purge end ports 4149b. A second offset port 4148b of each bleed valve cavity 4142b is connected with the manifold body end connection 4109 by an outlet passage 4143b to supply fluid to the end port 4051 of the MFC 4050 (FIGS. 18-21). When a supply valve subassembly (not shown, but may be similar to the valve subassembly 350 of FIG. 6) assembled with the supply valve cavity 4142a is in an open position and the corresponding bleed valve subassembly (not shown, but may be similar to the valve subassembly 350 of FIG. 6) assembled with the bleed valve cavity 4142b is in a closed position, fluid passes through the supply valve cavity, into the bleed valve cavity 4142b, through the second offset port 4148b and to the end connection 4109. When the supply valve subassembly is in a closed position and the corresponding bleed valve subassembly is in an open position, fluid in the valve cavities 4142a, 4142b and end connection 4109 may be purged from the manifold body 4145, for example, by applying a purge gas to a purge end port 4149b.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A multiple valve manifold assembly comprising:
an actuator assembly comprising:
a unitary actuator housing defining a plurality of actuator cavities each extending along a central axis from an upper surface of the actuator housing to a lower surface of the actuator housing;
a plurality of actuating members each disposed in an upper counterbore portion of a corresponding one of the plurality of actuator cavities and movable within the corresponding actuator cavity; and
a plurality of output shafts each extending through a lower bore in a corresponding one of the plurality of actuator cavities, each output shaft being driven by a corresponding one of the plurality of actuating members;
a plurality of valve body segments assembled with the actuator housing, the plurality of valve body segments each including first and second flow ports and a valve cavity receiving a corresponding one of the plurality of output shafts;
a plurality of valve subassemblies disposed in the plurality of valve cavities and movable by operation of the corresponding output shafts to control fluid flow between the first and second flow ports of each of the plurality of valve segments.

2. The assembly of claim 1, wherein the plurality of actuating members comprises a plurality of pistons, further wherein the actuator housing further defines a plurality of internal passages each intersecting with a corresponding one of the plurality of actuator cavities for fluid pressurization of a corresponding one of the plurality of pistons.

3. The assembly of claim 2, wherein the plurality of internal passages extends to corresponding inlet ports for attachment to a fluid pressure source.

4. The assembly of claim 3, wherein each of the plurality of inlet ports is configured to receive a press-fit push-to-connect fitting.

5. The assembly of claim 3, further comprising a plurality of solenoid valves each coupled to a corresponding one of the plurality of inlet ports.

6. The assembly of claim 5, wherein each of the plurality of solenoid valves is connected in fluid communication to provide a single supply port for pressurization of each of the plurality of pistons.

7. The assembly of claim 5, wherein the actuator housing further comprises an internal pressurization passage connected with a single supply port and extending to a plurality of branches, each of the plurality of branches extending to an inlet port of a corresponding one of the plurality of solenoid valves to supply pressurized fluid to each of the plurality of solenoid valves.

8. The assembly of claim 5, wherein each of the plurality of solenoid valves is installed in the actuator housing.

9. The assembly of claim 7, further comprising a shutoff valve connected with the single supply port and operable to prevent pressurization of each of the plurality of pistons.

10. The assembly of claim 9, wherein the shutoff valve comprises a lockout feature operable to secure the shutoff valve in a closed position.

11. The assembly of claim 2, wherein each of the plurality of internal passages intersects with a corresponding one of the plurality of actuator cavities below the corresponding piston for fluid pressurization movement of the corresponding piston from a lower axial position to an upper axial position.

12. The assembly of claim 11, further comprising a plurality of biasing members each disposed in a corresponding one of the plurality of actuator cavities to bias the corresponding piston toward the lower axial position.

13. The assembly of claim 12, wherein each of the plurality of biasing members comprises a stack of Belleville springs.

14. The assembly of claim 2, wherein each of the plurality of pistons has a substantially square cross-section.

15. The assembly of claim 1, further comprising a plurality of position sensors each actuated by a corresponding one of the plurality of actuating members to identify the position of the corresponding actuating member.

16. The assembly of claim 15, wherein each of the plurality of position sensors is disposed on a circuit board assembled with the actuator housing.

17. The assembly of claim 1, further comprising a cover plate assembled with the upper surface of the actuator housing to cover the first and second actuator cavities.

18. The assembly of claim 1, further comprising a plurality of manually adjustable stops for user adjustment of a limit position of a corresponding one of the plurality of actuating members.

19. The assembly of claim 1, wherein the actuator housing is produced using additive manufacturing techniques.

20. The assembly of claim 1, wherein the plurality of valve body segments are defined by a multi-valve manifold body.

21. An actuator assembly comprising:
a unitary actuator housing defining a plurality of actuator cavities each extending along a central axis from an upper counterbore portion on an upper surface of the actuator housing to a lower bore portion terminating at a lower surface of the actuator housing;
a plurality of actuating members each disposed in a corresponding one of the upper counterbore portions and movable within the corresponding actuator cavity; and
a plurality of output shafts each extending through a corresponding one of the lower bore portions, each output shaft being driven by a corresponding one of the plurality of actuating members;
each of the plurality of output shafts sealing with the corresponding one of the lower bore portions to prevent flow past the output shaft and the lower surface of the actuator housing;
the actuator assembly further comprising a plurality of position sensors each actuated by a corresponding one of the plurality of actuating members to identify the position of the corresponding actuating member, wherein each of the plurality of position sensors is in circuit communication with a single electrical connector.

* * * * *